United States Patent [19]

Paynting

[11] Patent Number: 5,182,552
[45] Date of Patent: Jan. 26, 1993

[54] MULTIPLE ZONE AUDIO SYSTEM

[75] Inventor: Richard J. Paynting, Cumberland, R.I.

[73] Assignee: Bose Corporation, Framingham, Mass.

[21] Appl. No.: 625,647

[22] Filed: Dec. 7, 1990

Related U.S. Application Data

[63] Continuation of Ser. No. 398,071, Aug. 24, 1989, abandoned.

[51] Int. Cl.[5] ............................................. G05B 19/00
[52] U.S. Cl. ..................... 340/825.25; 340/825.24; 340/825.69; 340/825.72; 455/352
[58] Field of Search ................... 340/825.25, 825.24, 340/825.69, 825.72; 381/59, 105; 455/3, 4, 230, 352, 353, 3.1, 2; 358/181, 185, 188, 198, 194.1

[56] References Cited

U.S. PATENT DOCUMENTS

| | | | |
|---|---|---|---|
| 4,037,250 | 7/1977 | McGahan et al. | 358/181 |
| 4,217,573 | 8/1980 | Norris | 340/825.25 |
| 4,496,947 | 1/1985 | Nakashima et al. | 340/825.24 |
| 4,771,283 | 9/1988 | Imoto | 455/352 |
| 4,843,386 | 6/1989 | Wolf | 340/825.72 |
| 4,855,730 | 8/1989 | Venners et al. | 340/825.25 |
| 4,862,159 | 8/1989 | Marusa et al. | 340/825.25 |
| 4,885,803 | 12/1989 | Hermann et al. | 340/825.72 |
| 4,965,557 | 10/1990 | Schepers et al. | 358/194.1 |

FOREIGN PATENT DOCUMENTS 2364586  5/1978  France ........................... 340/825.24

Primary Examiner—Donald J. Yusko
Assistant Examiner—Peter Weissman
Attorney, Agent, or Firm—Fish & Richardson

[57] ABSTRACT

A audio system may be monitored and controlled from one of many remote locations. The audio sources are located at a central location, however, the signals monitored at a remote location may originate from the same or a different source as the signal being monitored at the central location or any other location. The sources are selected and routed to speakers by at least two independent selectors, and the volume is controlled by associated volume controllers, either in the speakers or at the central location. Control of the system is simplified through the use of one or more radio frequency remote controls. Commands issued to the system from a remote control are verified by a verification signal added to the output signal on the appropriate output channels. To alleviate confusion, remote controls retain exclusive control over the source and output they most recently controlled. General function keys on the remote controls are used to control specific functions of the currently selected source, but may map to functions in more than one source.

15 Claims, 23 Drawing Sheets

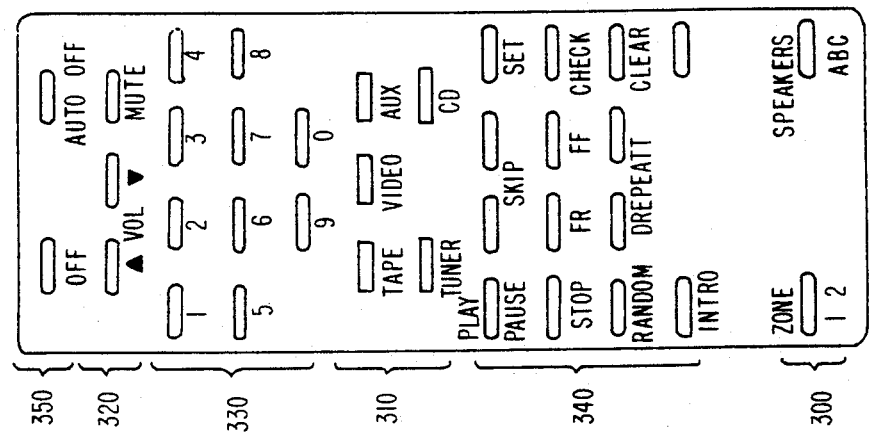
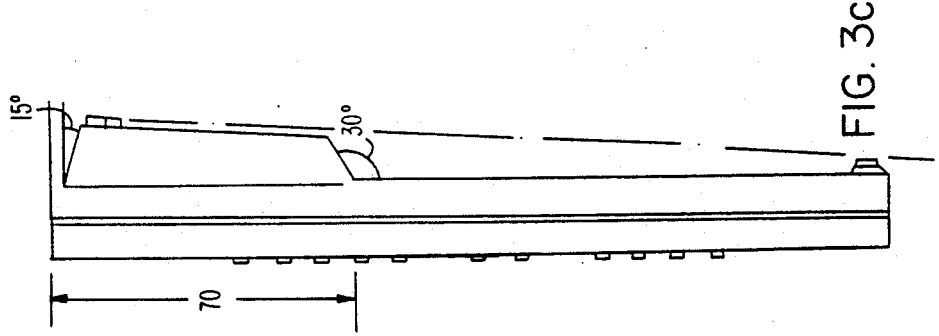
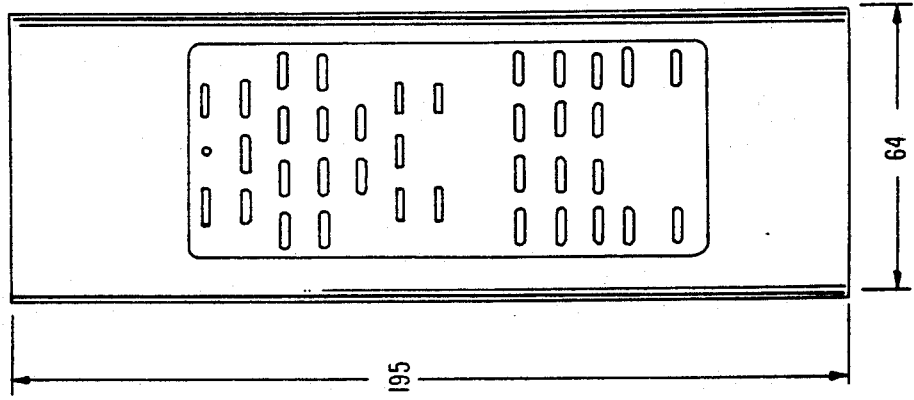
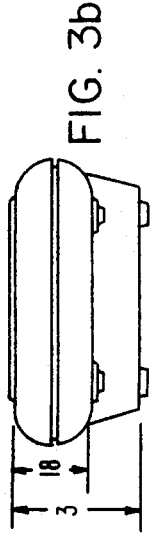

MULTIPLE ZONE AUDIO SYSTEM

BACKGROUND OF THE INVENTION

This application is a continuation of abandoned application Ser. No. 07/398,071 filed Aug. 24, 1989, now abandoned.

The invention relates to program signal processing systems.

Over the most recent few years, audio program systems have steadily increased in complexity. Generally, audio program systems consist of program signal sources which generate electrical signals, a selection system for selecting one program signal, an amplifier for electrically amplifying the selected signal, and speakers for transducing the amplified electrical signal to an audio output. When audio program systems were first developed, the program selection system allowed the listener to select, for input to the amplifier and speakers, from among a few input sources, such as a phonograph and an AM radio tuner.

Recently, as additional sources of audio programming became available, they were added to the selections available to audio program systems. Thus, modern audio program systems may allow the listener to select from many various program sources, such as AM and FM radio, phonograph records, audio tape, compact discs, or the audio accompanying video broadcast or video tape programs.

As the variety of available program material increased, it became desireable to make audio programs accessible to more living environments. In response, audio program systems began providing a facility for driving multiple speakers from the amplifier. This increased the access to audio programs by, for example, delivering the programs to speakers in more than one room. In such multiple speaker systems, relocating the additional speakers to new rooms involved rewiring the audio system, because the electrical signals from the amplifier to the speakers were to be carried by fixed, low impedance speaker wires.

To allow the speakers to be more easily moved, active speakers, which have self-contained amplifiers, were developed. In active speaker systems, the program sources and signal selection system are centrally located. Wireless methods, e.g. radio transmission, or existing wiring within the living environment, e.g. the AC wiring in the building, are used to transmit the selected program to the speakers. The amplifiers and speakers then amplify and transduce the received signal into an audio output.

Increased availability of audio programs also heightened the need for remote control of audio program systems. To answer this need, optical signal transmission technologies, such as infra-red technology, were adapted to remote controllers for audio program systems. These remote controllers permitted a listener located anywhere within the room containing the signal selection system to control the audio programming.

While the addition of remote controllers made audio programming more convenient, the syntax of the infra-red remote control signals was not standardized among the vendors of audio equipment, and thus the listener typically needed several remote controllers to control his or her particular selection of audio program sources. To unify remote control of audio program systems, programmable remote controllers were developed. A programmable remote controller is capable of learning the commands for any number of other remote controllers, and thereafter may be used in place of the other controllers.

Although programmable infra-red remote controllers allow the listener convenient control of the audio system and freedom of movement within one room of the listening environment, infra-red does not penetrate opaque barriers, and therefore the listener could not leave the room containing the signal selection system without also relinquishing control of the audio programming. To permit the listener to control the system from other locations (such as those containing second pairs of speakers), infra-red transponders were developed. Infra-red transponders receive infra-red signals from a remote controller in a remote location (room) and re-broadcast the signals within the central location (room), thus allowing the user to control the audio program system from remote locations. If the remote speakers are moved to a new location (e.g., where active speakers are in use), the remote transponder must be also be relocated to allow control in the new location.

In response to the wide range of video programs that are currently available (i.e., cable and broadcast television, video tape and video discs), video program systems use similar techniques to those described above to broaden access to video programs. Known video program systems may implement multiple monitoring devices (i.e. video monitors or televisions), infra-red remote controls, programmable remote controls, and remote infra-red transponders.

SUMMARY OF THE INVENTION

According to one aspect of the invention, a program signal system is monitored and controlled from one of many remote locations. The program sources are located at a central location, however, the program signal monitored at a remote location may originate from the same or a different program source as the signal being monitored at the central location or any other location.

In preferred embodiments of this aspect, the monitored signals are audio signals from a compact disc player, a radio tuner, a phonograph player, a television audio signal tuner, or an audio tape player. The circuitry at the central location includes a central controller and at least two independent selectors which can independently select from the input sources for routing to an output channel. Also, the circuitry may include at least two volume controllers responsive to the central controller for attenuating a selected output channel. Active speakers which receive radio transmissions from the output channels, or passive speakers are used. Active speakers may be more easily relocated.

According to another aspect of the invention, control of the system is simplified through the use of one or more remote interfaces. To aid in control of the system, commands issued to the system from a remote interface are verified by a verification signal added to the output signal on the output channels.

In preferred embodiments, the verification signal may have a plurality of identifiable types, each type being used for verification of different functions in the system. To alleviate confusion, when a command is received from a remote interface, the verification signal is added only to the source output last initiated by that interface. Also, the remote interfaces retain exclusive control over the source and output they most recently controlled. A radio frequency remote control transmitter is used as the remote interface. The frequency used can be the 27.145 MHz residential band. As the radiofrequency signal penetrates opaque walls, no infrared transponders are required.

In another aspect, the remote interfaces have at least one source selection input and at least one general functional input, where the general functional input corresponds to control functions for more than one source. The central controller is responsive to the source selection inputs to select an audio signal from among the sources and is responsive to the general functional input to control the selected source. In this way, general function keys on the remote controller may map to functions in more than one input source.

In preferred embodiments, to alleviate interference between two systems of the type set forth above, the remote interfaces include an authenticator that authenticates transmitted instructions in accordance with a house code, and the central controller includes a verifier that verifies received instructions in accordance with the house code.

DESCRIPTION OF THE PREFERRED EMBODIMENT

We first briefly describe the drawings.

Figure 2:
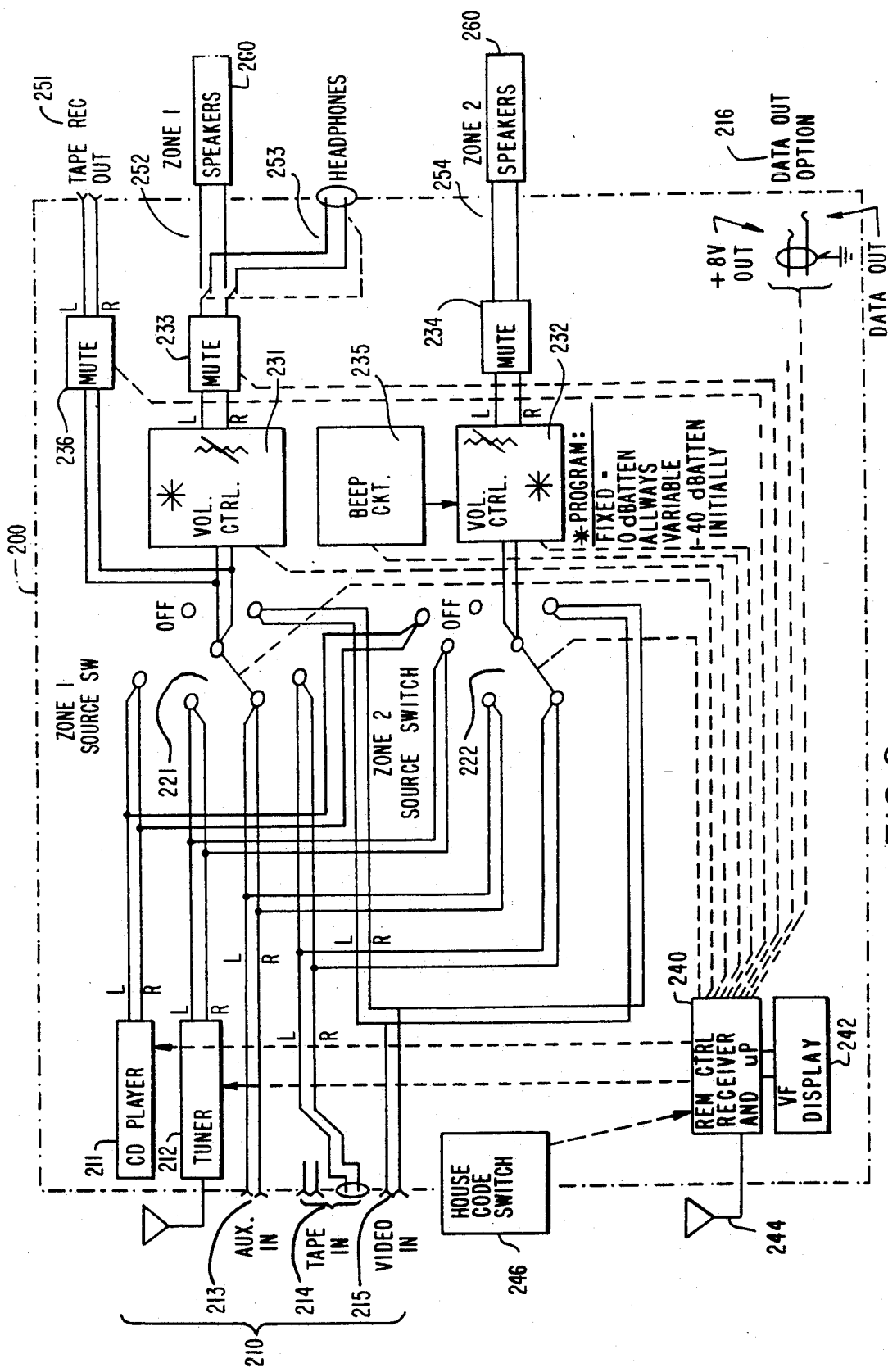
FIG. 2 is a block diagram of a program signal processing system adapted for audio programs.

FIGS. 3a, 3b, 3c, and 3d are a drawing of a remote controller for the system of FIG. 2, showing the keypad layout.

FIGS. 4-1 to 4-10 and 5-1 to 5-10 are electrical schematics for the program signal processing system of FIG. 2.

OVERVIEW

As the availability and selection of program signals, in particular audio and video program signals, has increased, the demand for access to program signals in living environments has also increased. For example, at one time in a private home, members of a family may wish to view cable television programming in the living room, view videotapes in the bedroom, and listen to FM stereo in the kitchen. At another time, the family may wish to listen to a compact disc in the bedroom and kitchen, and listen to a phonographic record in the living room. Similar situations may occur in business environments where, for example, audio and video programs are used for instructional or sales purposes.

One method for providing multiple rooms access to several program signals is to simply provide each room with a complete audio and video program system. In this method, every room has access to every type of program source, independent of the other rooms. Although this method allows rooms to access different program signals independently, it is difficult to provide the *same* program signal to more than one room. For example, consider the example of the private home above. In order for the family to listen, e.g., to the same compact disc in the bedroom and kitchen at the same time, the family would need to own two copies of the compact disc. Even if the family owned two copies of the compact disc, it would be difficult to synchronize the programming of the compact disc being played in the kitchen with that of the compact disc being played in the bedroom. This could be disturbing if a family member left the bedroom to, for example, visit the refrigerator in the kitchen.

Another difficulty with the above method is that it requires a high level of redundancy, because each room must have, for example, it own compact disc player, phonograph, radio tuner, audio tape player, video tape player, and video disc player. This can be prohibitively expensive.

An alternative method for providing program signals to a home or business, which avoids some of the above difficulties, uses a single, centralized program signal system and multiple monitors (e.g., televisions or speakers) in the various rooms. In this method, using the above example, one would place the single audio program signal system in the bedroom, and provide additional sets of speakers in the kitchen and living room. Then a compact disc program could be played simultaneously in the bedroom and kitchen. Also, redundancy would be eliminated.

However, in this method, it would not be possible to monitor different program signals in different rooms of the home or business, as all program signals would originate from the single central system. Returning to the above example, it would not be possible to listen to a phonograph program in the living room while a compact disc program was being monitored in the bedroom and kitchen.

In addition, for the remote monitoring stations to control the program signal, remote control transponders have to be installed at each of the remote locations. As discussed above, this would require wiring the home for the remote transponders, and would make it more difficult to move the remote monitors. Remote control of the central program signal system also produces an arbitration problem, because all rooms have control of the program signal. This would create difficulties when, for example, one family member in a remote location wishes to adjust the volume or change program sources, but another family member in the central location prefers the current volume or program source. No arbitration is provided to determine which family member determines the programming, and it is impossible for the family members to negotiate because they are in different rooms of the home.

The invention is a program signal processing system which avoids the above difficulties by allowing several program signal monitoring locations to independently access a centralized group of program signal sources. Because the program signal sources are centralized, redundancy is eliminated and it is possible to monitor the same program signal in multiple locations. At the same time, however, each monitoring location has independent access to all of the available program sources, and can therefore monitor any of the program sources.

Figure 1:
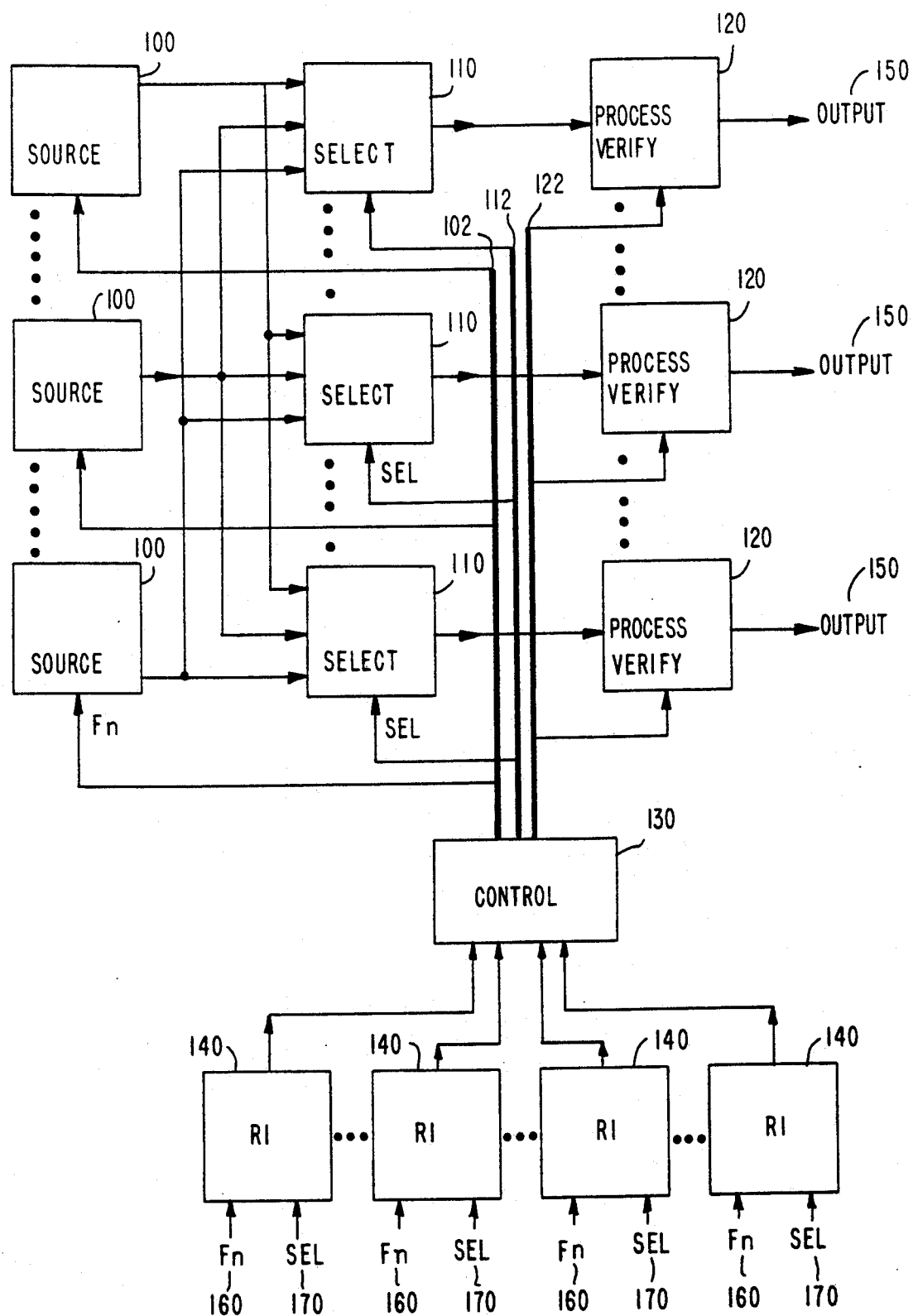
FIG. 1 is a block diagram of a program signal processing system.

Referring to FIG. 1, a program signal processing system according to the invention comprises a plurality of program sources 100 (three being shown for illustrative purposes), a plurality of program signal selectors 110 (three being shown for illustrative purposes), a plurality of verify and processing blocks 120 (three being shown for illustrative purposes), a plurality of remote interfaces 140 (four being shown for illustrative purposes), and a central controller 130.

The program signal system of FIG. 1 provides multiple output channels 150, which are used by monitors (e.g. speakers or televisions) in the various monitoring locations (e.g. rooms of the home or business) to monitor the program signal sources. As will be further discussed below, any one of the program signal sources 100 may be monitored by any one of the monitors. Therefore, two monitoring locations may monitor the same program signal source, but may also monitor different program signal sources.

It will be appreciated that the plurality of program signal sources 100 may include multiple program signal sources of the same type, e.g., there may be two compact disc players or two cable television tuners. Thus two monitoring locations may, for example, simultaneously monitor different compact disc programs, if desired. Also, it will be appreciated that multiple monitors may be connected to each output channel. For example, multiple speakers or video installed in the same room may monitor the same output channel.

Each output channel 150 is able to independently monitor any one of the program signal sources because output signals are selected by independent program signal selectors 110 (and processed by independent process and verify blocks 120, which will be discussed below). The inputs to each selector 100 are all of the available program signals, and the output of each selector 110 is the selected program signal. This selected signal is processed and verified in block 120 (see below) and is delivered to output channel 150. It is fundamental to the invention that the selectors are multiple and independent—this allows the program signals to be similarly independent.

The fundamental structure of the program signal processing system, as set forth above, allows multiple independent access to the program signal sources. To complement this functionality, the program signal processing system also facilitates uniform remote control of the system from the various monitoring locations. This is provided by the central controller 130 and a plurality of remote interfaces 140.

Central controller 130 monitors and controls the operation of the program signal processing system, and supports remote interfaces 140 to control the system. As seen in FIG. 1, controller 130 may have control inputs on a bus 102 to each program signal source 100, on a bus 112 to each program signal selector 110, and on a bus 122 to each process and verify block 120.

Central controller 130 transmits control inputs through bus 102 to the program sources 100 to control the programming of the sources. For example, in a video program source system, the controller may select the channel of a cable decoder program source 100, and may start, stop, and pause a video tape program source 100. In an audio program source system, controller 130 may select tracks in a compact disc program source 100, or may start, stop, and pause an audio tape program source 100.

Central controller 130 further transmits control inputs through bus 112 to the program source selectors 110 to select particular program source inputs for output to the process and verify blocks 120 and output channels 150. Central controller 130 also transmits control inputs on bus 122 to the process and verify blocks 120 to process and verify the signals to be placed on the output channels 150. For example, controller 130 may control process and verify blocks 120 to change the volume or frequency response of an audio signal in an audio program signal system, or process the synchronization pulse and chroma signal of a video signal in a video program signal system. Verification functions of process and verify blocks 120 may also be controlled, as discussed below.

The central controller 130 also supports a plurality of remote interfaces 140. The remote interfaces may be conveniently used to send commands to the central controller without using the direct inputs to the central controller. For example, a remote interface may be used to send commands to the central controller from across the room, or from another room.

Each remote interface can accept, and transmit to the central controller, inputs of two types. A first type of input is a functional input 160. Functional inputs 160 control (via the central controller 130) the programming functions supported by the various program sources 100, as well as the various processing functions supported by the process and verify blocks 120. For example, using the functional inputs 160 to a remote interface 140, a listener could control a compact disc player program source 100 to select tracks from and play a compact disc, and then control a process and verify block 120 to change the volume and frequency response of the resulting program.

A second type of input to a remote interface 140 is a selection input 170. Selection inputs 170 control (via the central controller 130) the source selections of the program source selectors 110. For example, using the selection inputs 170 to a remote interface 140, a listener could select the signal from a compact disc player program source 100 to be output to one or more process and verify blocks 120 and the related output channels 150.

In the above example of a private home, therefore, one family member would use functional inputs 160 on his remote interface 140 to choose tracks from and play a compact disc, and then use selection inputs 170 on his remote interface 140 to select the compact disc program signal to be monitored in, for example, the bedroom and kitchen. At the same time, another family member could use functional inputs 160 on a different remote interface 140 to program a phonograph program source 100 to play a phonograph record, and then use selection inputs 170 to select the phonograph signal to be monitored in, for example, the living room.

As can be seen from the above example, it is possible for the system of FIG. 1 to provide multiple program signals to multiple rooms in, for example, a private home. Two complications this creates, namely arbitration and verification, are dealt with through provisions of the invention.

The difficulty of arbitration of multiple room control was discussed earlier in light of a single, centralized program signal system having only one selector 110. In the invention, incidences of such arbitration problems are reduced, because each room may independently select, process, and monitor any of the program signals available from the program sources 100. However, it is possible that a first person may attempt to use his remote interface 140 to change the selected program signal source for a room after a second person had previously selected (with another remote interface) a different program signal source for the room. Similarly, the first person may attempt to use his remote interface 140 to control functions of a program signal source which had previously been controlled by the second person.

It is clearly undesirable to allow multiple people to control the functions of one program signal source 100 at one time or to control the source selection of one monitoring location at one time. Therefore, the central controller 130 establishes an arbitration between the remote interfaces 140, the functions of the program sources 100, the selections of the program source selectors, and the processing of the process and verify blocks 120. In one embodiment, the first remote interface to control the functions of a program source 100 maintains exclusive control over the functions of that program source 100 until this control is relinquished. Control may be relinquished when the remote interface is used to control the functions of another program source 100, or when the system power is turned off. Similarly, the first remote interface to control the selection of a selector 110 maintains exclusive control over the selection of that selector 100 until this control is relinquished. Again, control may be relinquished when the remote interface is used to control the selection of another selector 110, or when the system power is turned off. To maintain consistency, the remote interface which has exclusive control over the selections of a selector 110 should also have control over the processing of the associated process and verify block.

The above scheme establishes an arbitration between the remote interfaces 140. Each remote interface will have exclusive control of the program source 100 and selection device and process and verify block 120 that it most recently controlled. One remote interface may still control more than one program source 100, selector 110, and process and verify block 120, but will only have exclusive control of one. Returning to the example of the private home, the family member who wishes to listen to a compact disc in the bedroom and in the kitchen should decide which room he wants to have priority in, and act accordingly. If most of his time will be spent in the bedroom, with short trips to the kitchen, he should select the compact disc player program source 100 in the kitchen first, then in the bedroom, so exclusive control is maintained in the bedroom. Regardless of the order of the room selections, the family member will maintain exclusive control of the compact disc player until he controls the function of another program source 100.

The invention also verifies commands received from the remote interfaces 140 to the person sending the commands. Ordinarily, only one room will contain the central controller 130 and the associated program sources 100. Therefore, to facilitate control of program signals in other rooms, it is useful to provide verification of commands received by the central controller 130 from remote interfaces 140. This verification is provided by the process and verify blocks 120, by adding a verification signal to the program signal in response to received commands. The sum of the verification signal and the program signal are then sent to the appropriate monitor or monitors via output channel 150. In operation, central controller 130 uses control signals on bus 122 to control process and verify blocks 120 to add these verification signals to the proper output channels 150.

The verification signal is sent to the correct output channels by using the arbitration scheme above. Verifications of commands received from a given remote interface 140 are sent to the output channel for which that interface has exclusive control. Therefore, when a remote interface 140 controls a program selector 110 to select a particular program signal for one output channel 150, that command and any future commands (until another selector 110 is controlled) from that remote interface are verified to that output channel 150.

In an audio program signal system, the verification signal may be one of many different audible tones, or may be a synthesized voice verification. In a video program signal system, the verification may be an audible signal such as above, or may be visible, such as a text message temporarily added to the video signal on the output channel 150.

DETAILED DESCRIPTION

Referring to FIG. 2, a particular embodiment of an audio program signal processing system 200 comprises audio program sources 210, independent audio program selectors 221, 222, processing and verification circuitry 231, 232, 233, 234, 235, 236, Output channels 251, 252, 253, 254, and central controller 240.

The audio program sources 210 for system 200 are internal and external. System 200 has an internal compact disc player 211 and an internal radio tuner 212. In addition, system 200 provides inputs for an auxiliary program source 213, two audio tape players 214, and the audio accompanying video programs 215. The internal program sources 211, 212 are controlled by a central controller 240, which comprises a microprocessor and support circuitry. In addition, the external sources may also be controlled by central controller 240 via signals transmitted through a digital data port 216, which may be connected to control inputs in suitably configured audio equipment.

Central controller also controls audio selectors 221, 222 to select desired audio program sources for the output channels. These signals are then amplified and transduced into audio in two regions of the listening environment, which are called "zone 1" and "zone 2". It is assumed that the speakers connected to the zone 1 channel are in the same room or area as system 200.

Audio selector 221 energizes zone 1 volume control circuit 231, which energizes a muting circuit 233 and a headphones output 253 or speakers 260 on zone 1 output channel 252. The headphones output 253 is energized when a headphone plug is inserted into the headphones output 253. Otherwise, the speakers 260 on output channel 252 are energized. Additionally, audio selector 221 energizes a muting circuit 236 and an audio tape source record output 251. Using the audio tape source record output channel 251, the zone 1 source, i.e., that selected by selector 221, may be recorded by an external audio tape player. Zone 2 audio selector 222 energizes volume control circuit 232, which energizes a muting circuit 234 and speakers 260 on zone 2 output channel 254.

Commands are verified in zone 2 by beep circuit 235, which generates an audible tone for addition to the program signals selected by zone 2 audio selector 222. Various types of tones are used to indicate various types of commands and operating conditions in the system 200. For example, when a command is received and understood, a short 1000 Hz tone is returned. When a non-functional key on the remote controller is pressed (see below), a long tone of about 1 second is returned. Also, when a command is received but cannot be acted upon due to exclusive control by the other zone (see below), three short tones are returned.

Commands received by system 200 are radiofrequency signals broadcast from remote controllers (not shown). Commands are received by antenna 244. Because the zone 2 speakers are in a remote locations, received commands are audibly verified to the zone 2 output channel only. In other embodiments having additional output channels and selectors, commands could be verified only to the related output channel, in accordance with the arbitration methods discussed above. In zone 1, instead of audio verification, commands are visibly verified on a vacuum fluorescent display 242, which is mounted on the case of system 200.

Commands to central controller 240 may control the amplitude of program signals by controlling volume control circuits 231, 232. Volume control circuits 231, 232 are preferably stepped attenuator amplifier circuits which may be controlled by digital electronic signals. Commands received by central controller 240 may also mute the zone 1 and zone 2 output channels 252, 253, 254 or the audio tape record out channel 251 by controlling muting circuits 233, 234, 236.

In the embodiment of the invention shown in FIG. 2, the amplitude of signal delivered by the zone 1 and zone 2 remote speakers 260 is controlled by volume control circuits 231, 232. Program signals from system 200 drive the speakers via amplifiers (not shown) and speaker wires. In alternative embodiments, the speakers may be wireless, in which case an amplifier and speaker wires would not be used, rather, a transmitter would send the selected zone 1 and zone 2 audio program sources to the speakers. In other embodiments, wireless speakers would only be used in zone 2. Where a powered speaker system or amplifier having a volume control function is used, the volume control circuit for zone 2 may be disabled, fixing the zone 2 volume at 0 dB attenuation. Otherwise, when using a self-powered speaker system or an amplifier not having a volume control, the volume control circuit should be enabled, resulting in a −40 dB initial attenuation. In most cases, it is preferable to use a centralized volume control system of some sort, so that the volume of the programs being monitored at the remote locations may be controlled by the central controller.

Multiple remote controllers may be used with system 200. Remote controllers can transmit source selection commands for controlling zone 1 and zone 2 source selectors 221, 222, volume commands for controlling zone 1 and zone 2 volume circuits 231, 232, or other commands for controlling the program sources 211, 212, or the muting circuits. An arbitration scheme, in accordance with the overview above, provides the controllers with exclusive control of volume and source selection for one zone, as well as the source functions for the selected source.

Figures 1, 4:
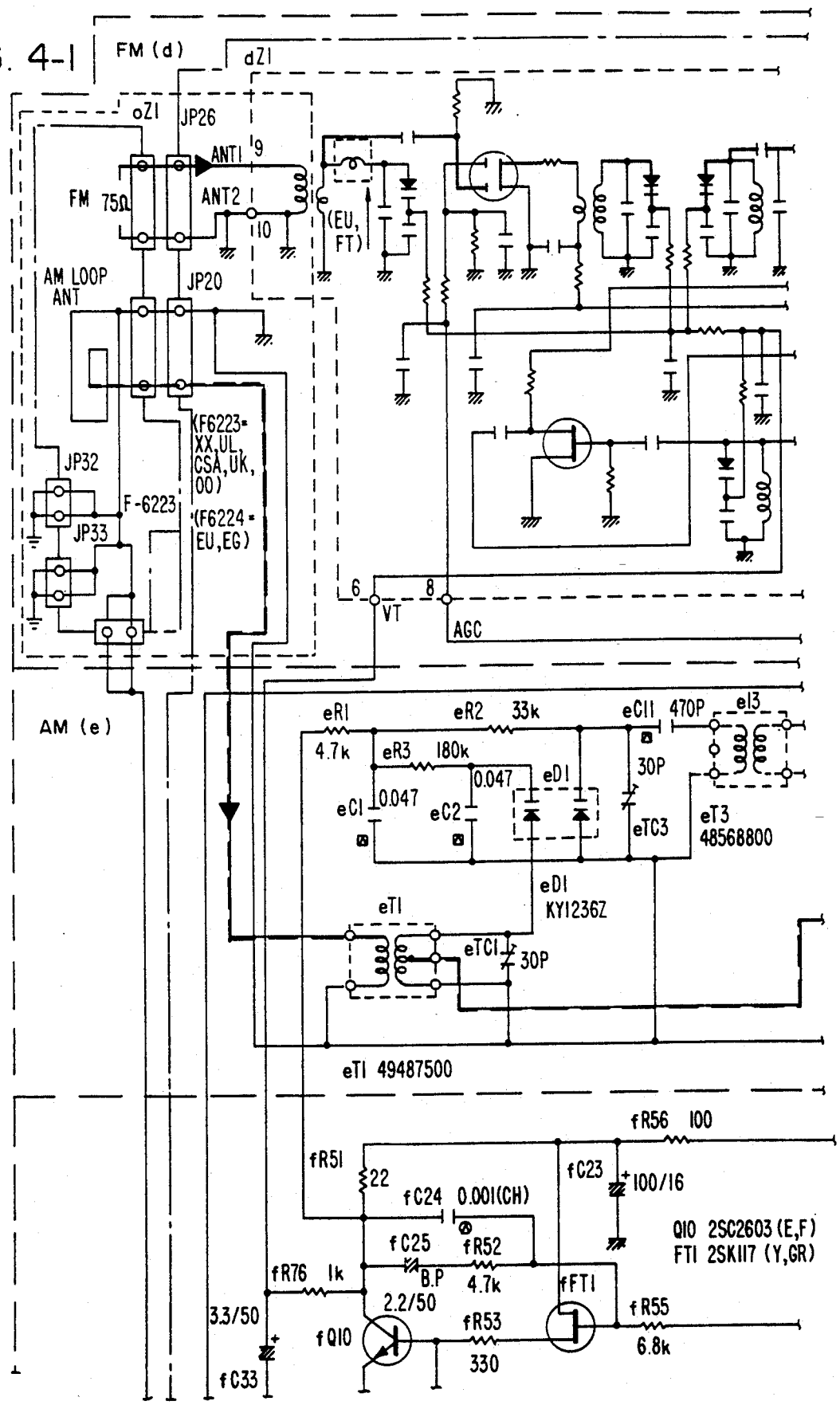
Figures 2, 4:
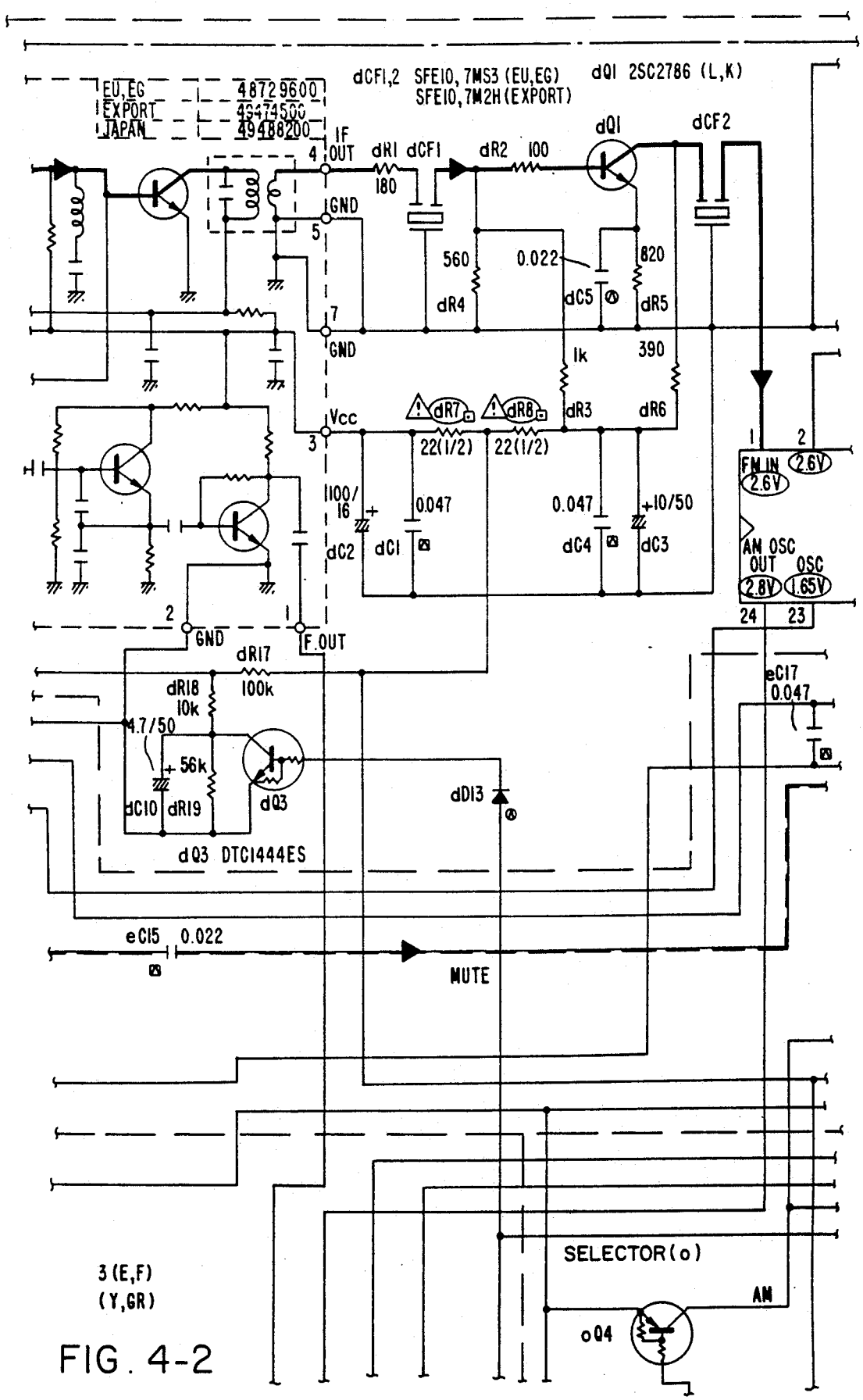
Figures 3, 4:
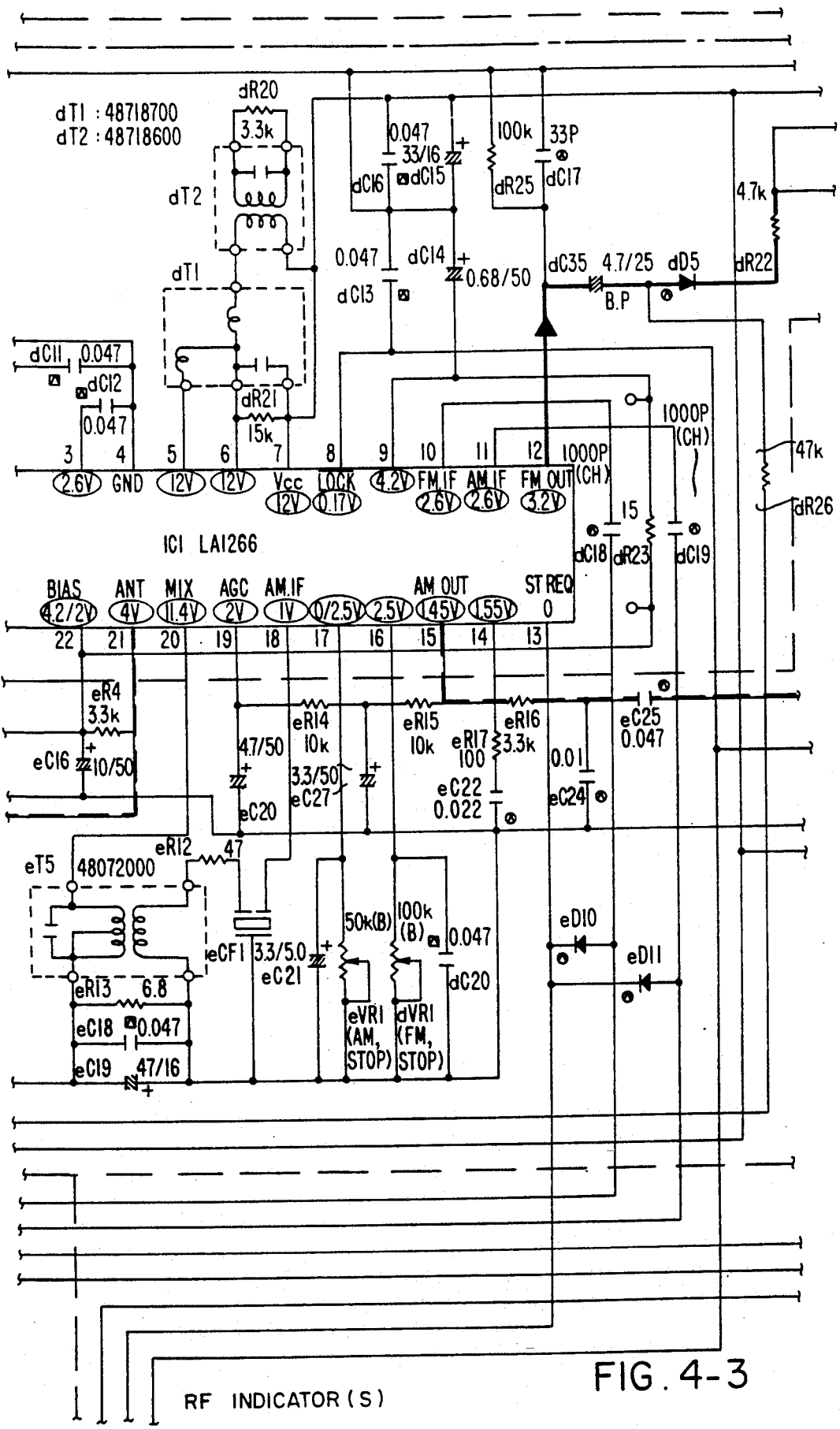
Figure 4:
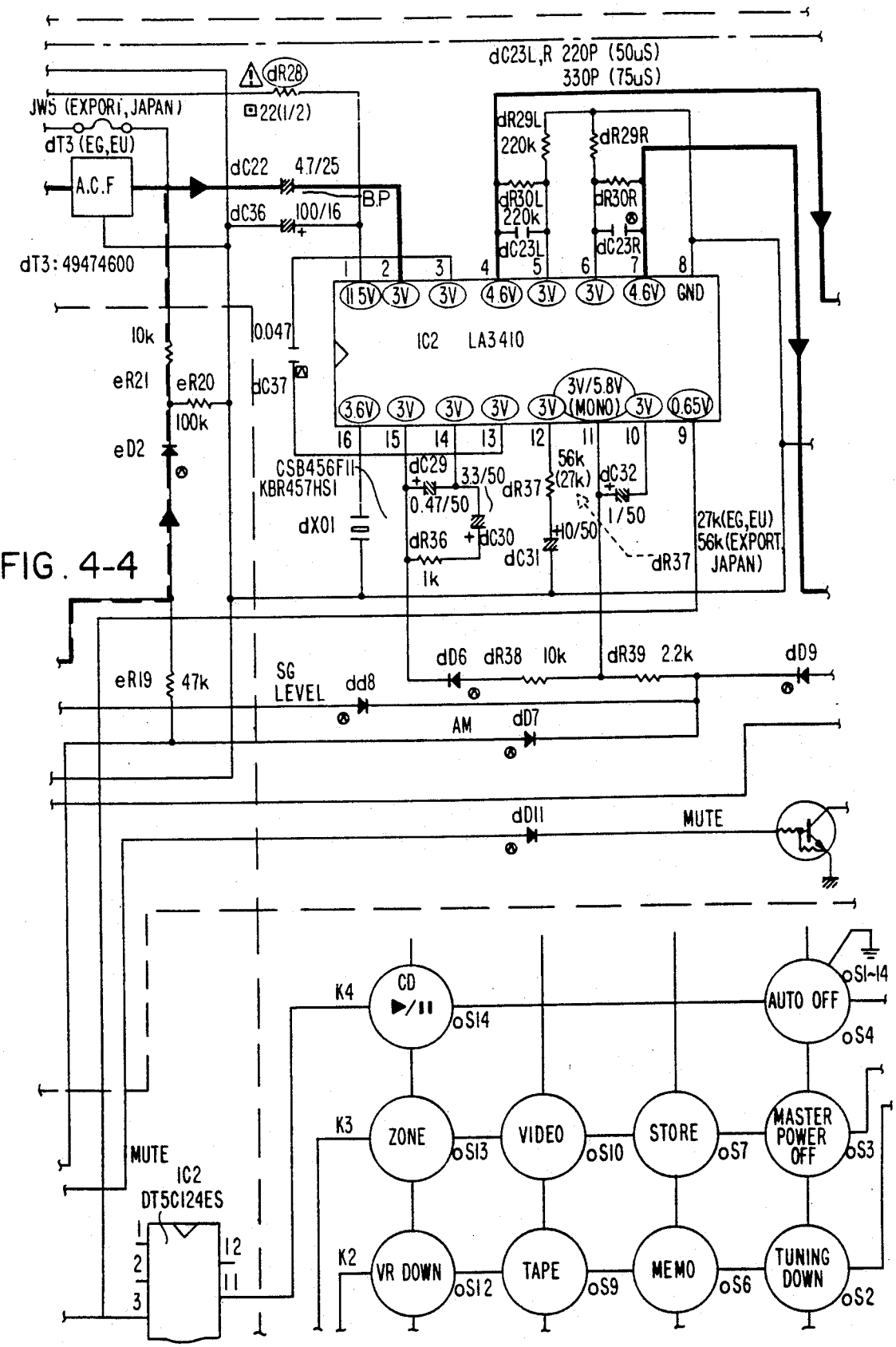
Figures 4, 5:
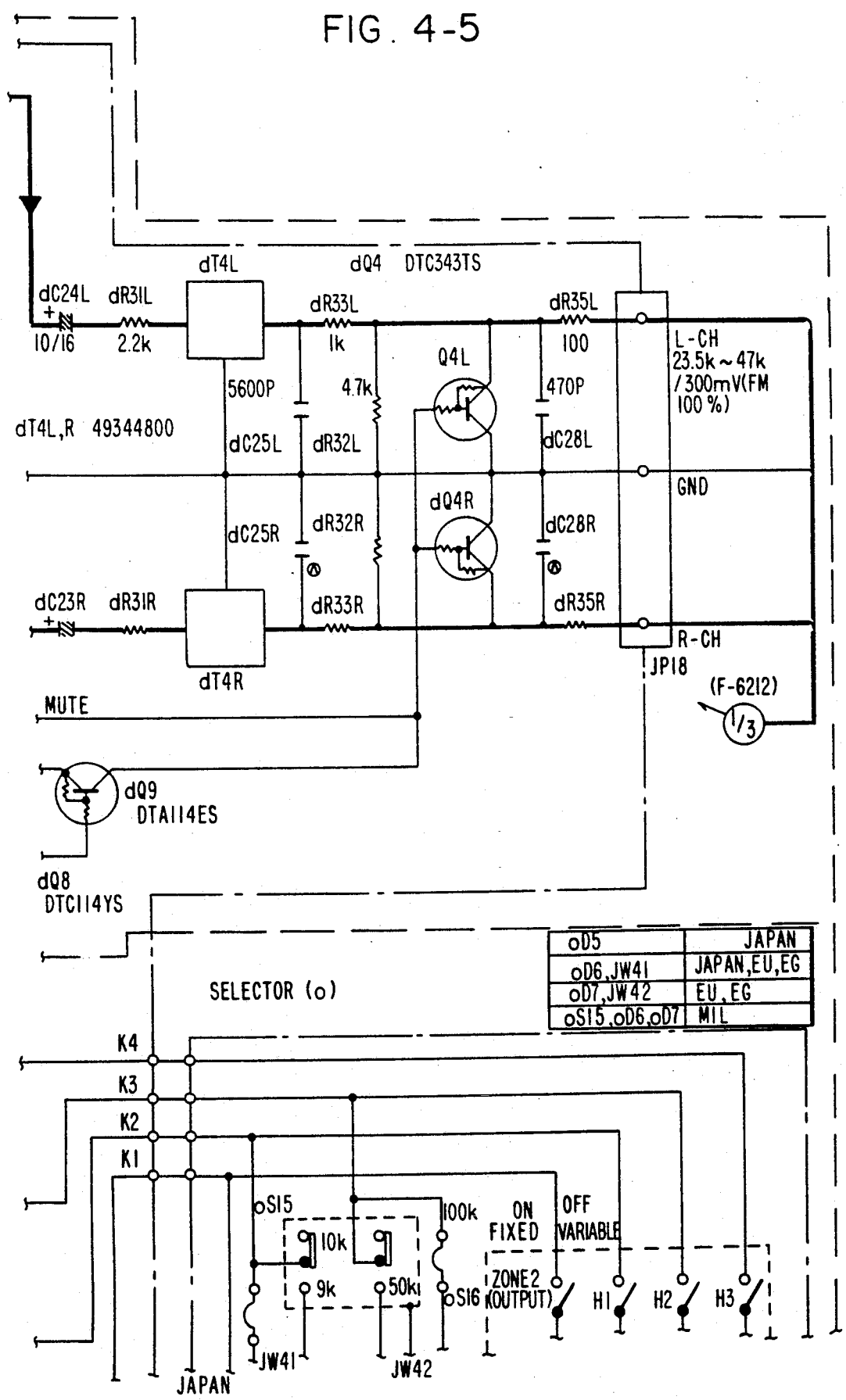
Figures 4, 5, 6:
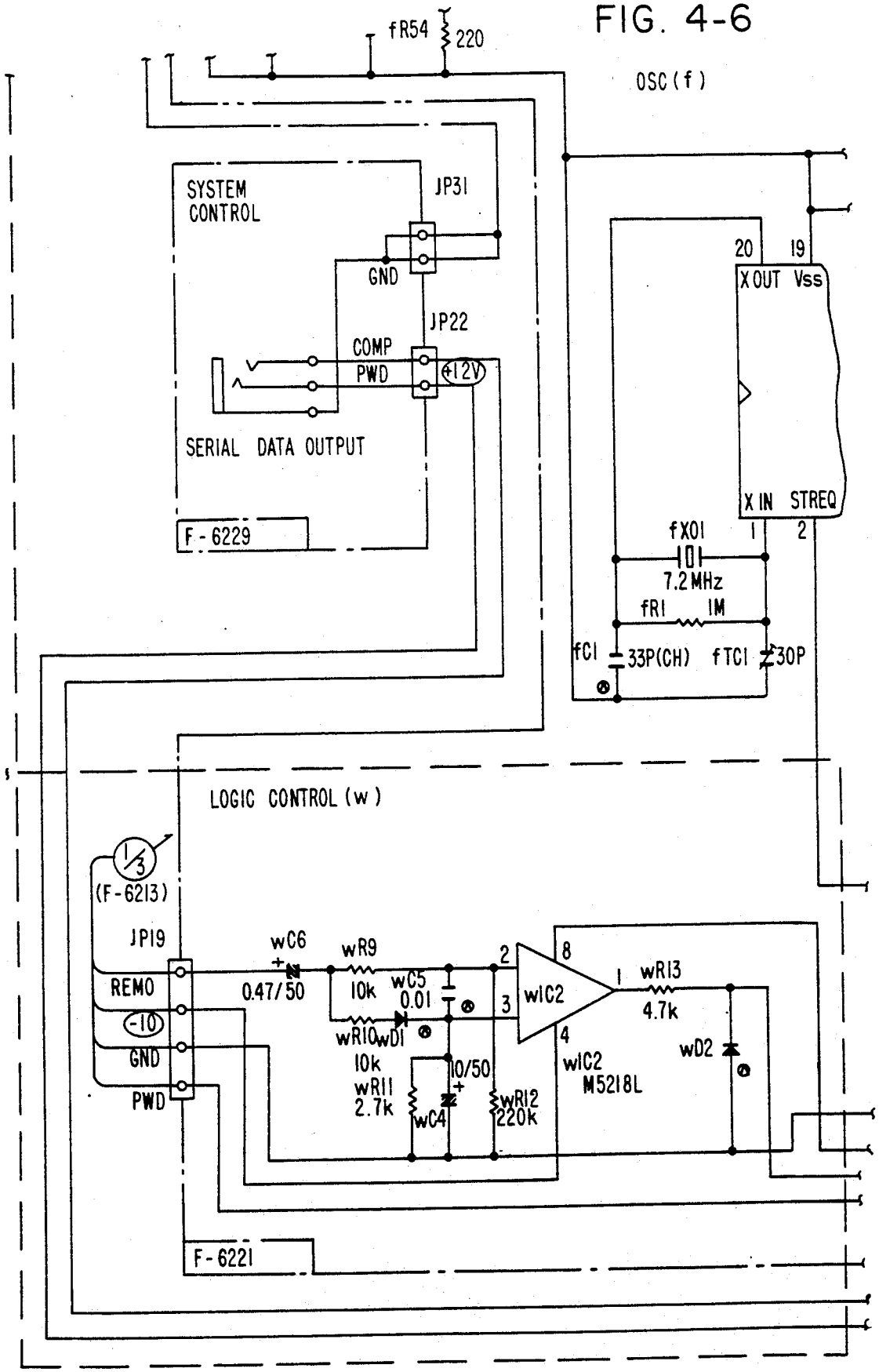
Figures 4, 5, 6, 7:
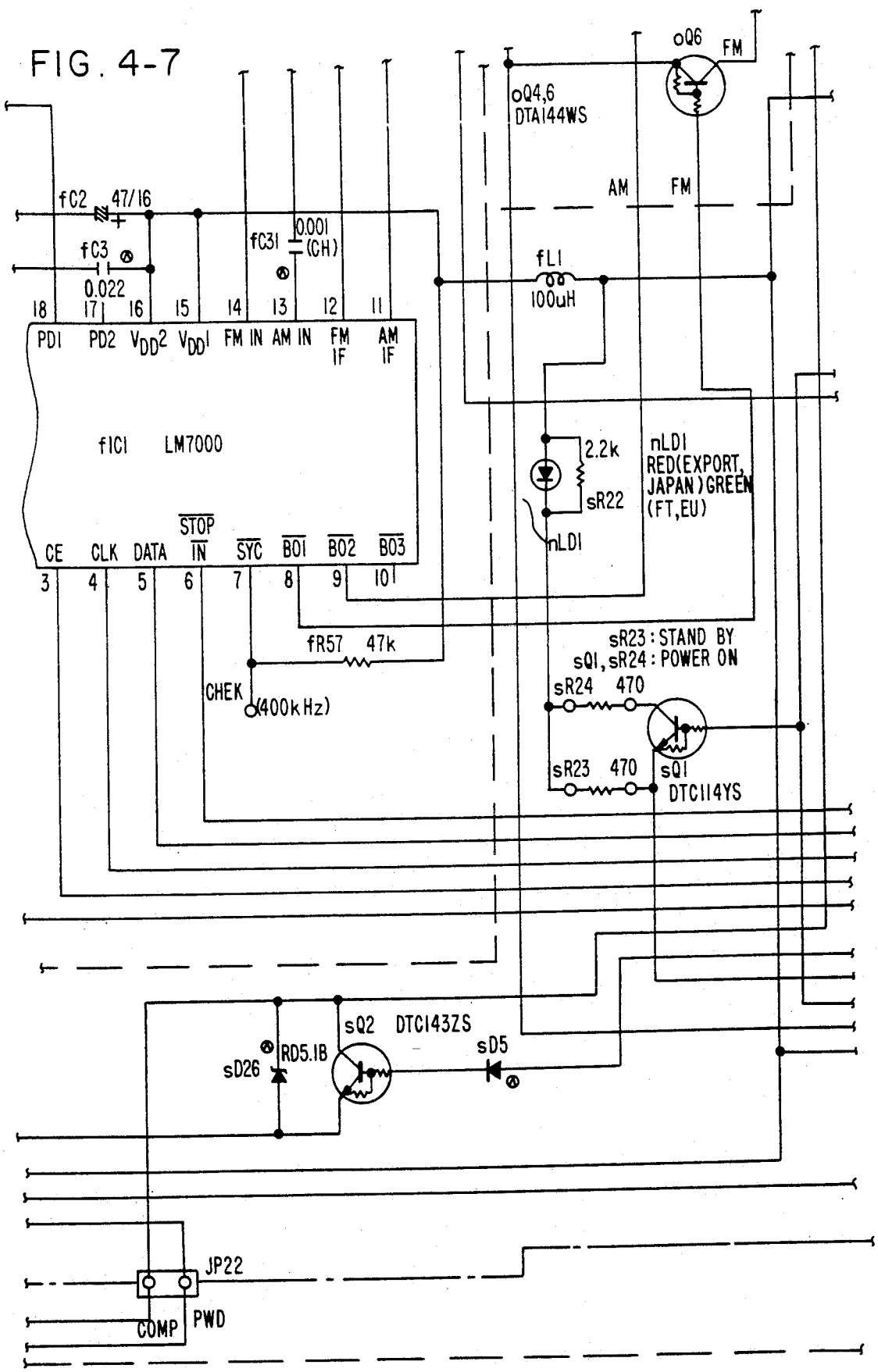
Figures 4, 5, 6, 7, 8:
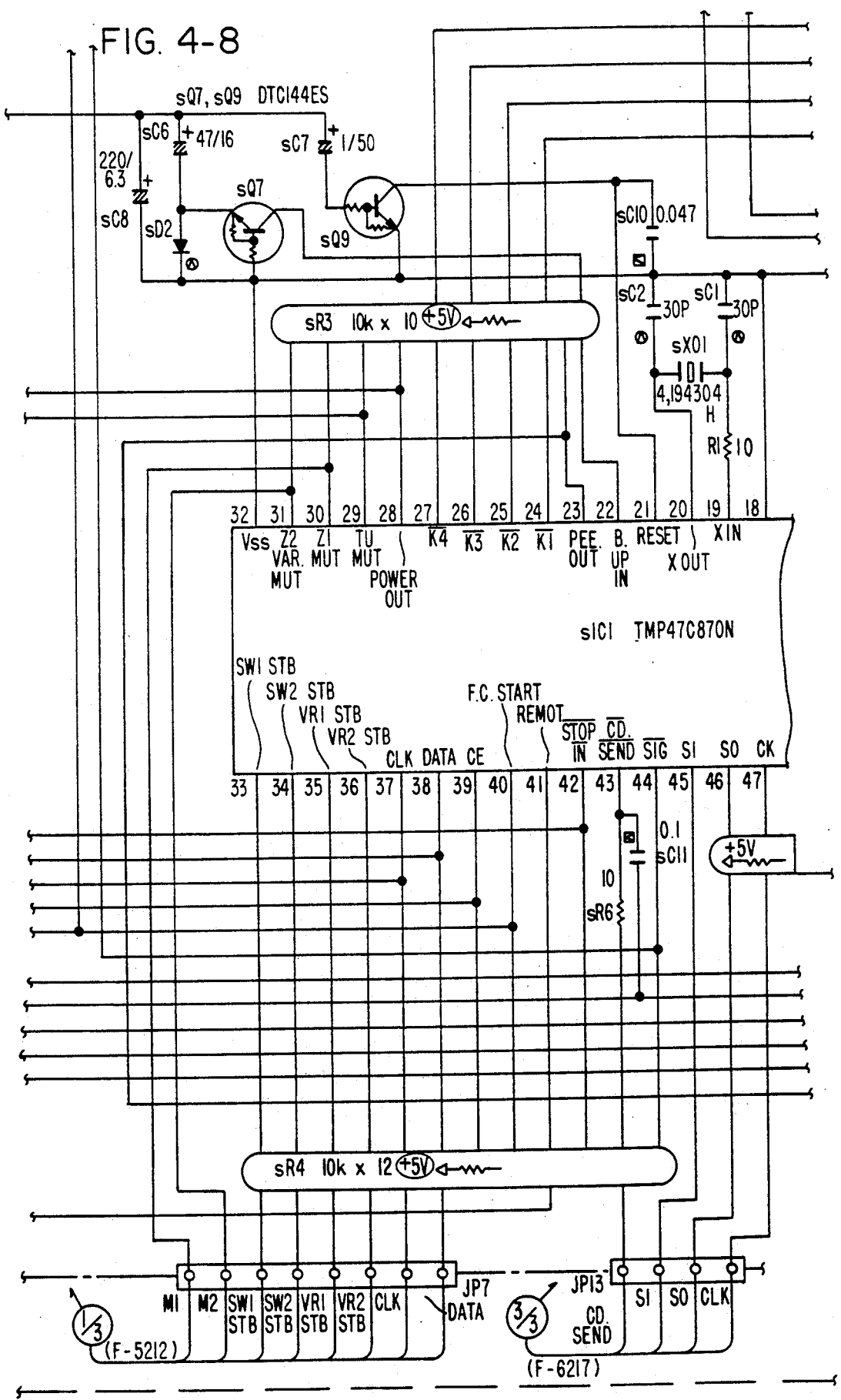
Figures 4, 5, 6, 7, 8, 9:
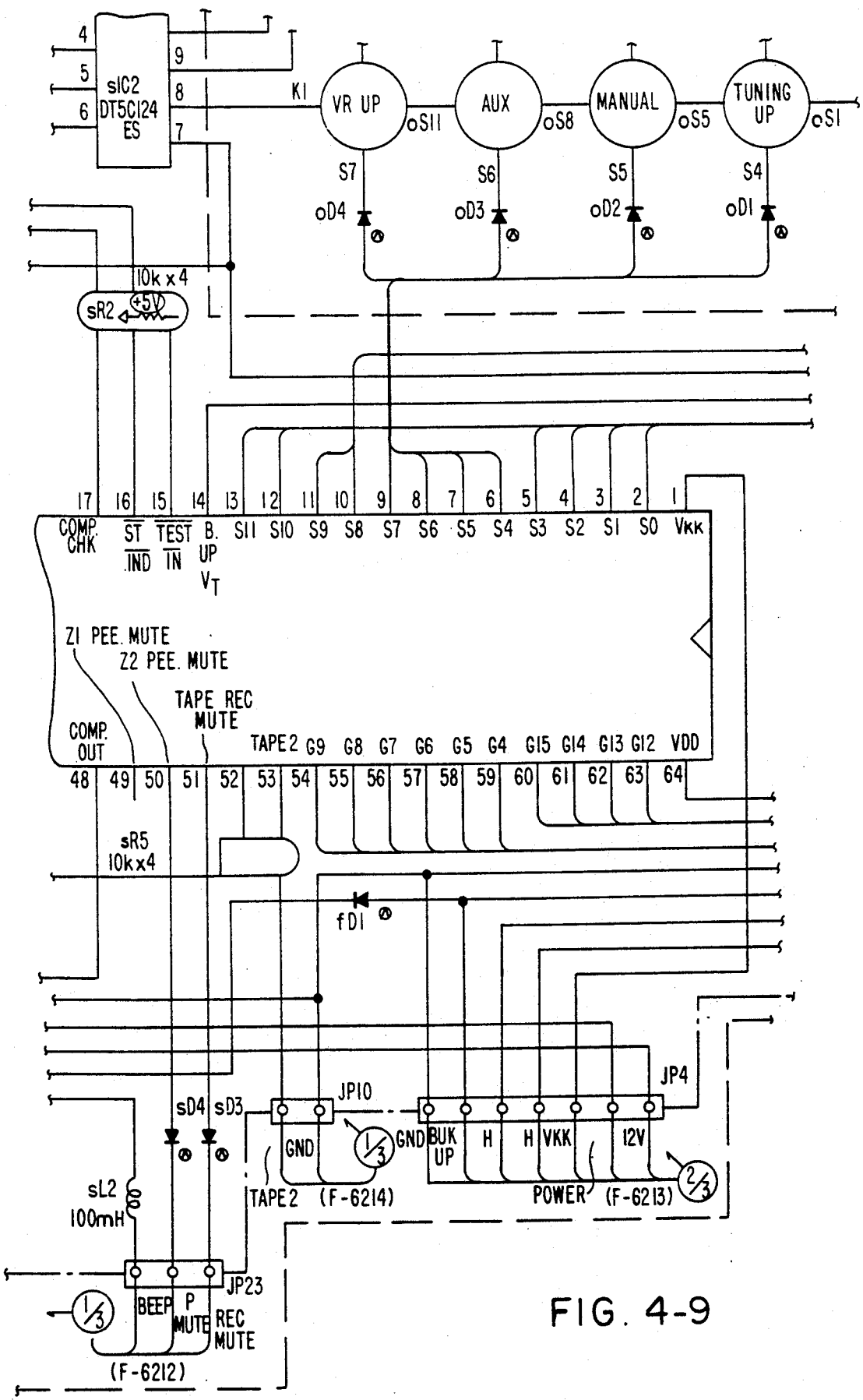
Figures 4, 5, 6, 7, 8, 9, 10:
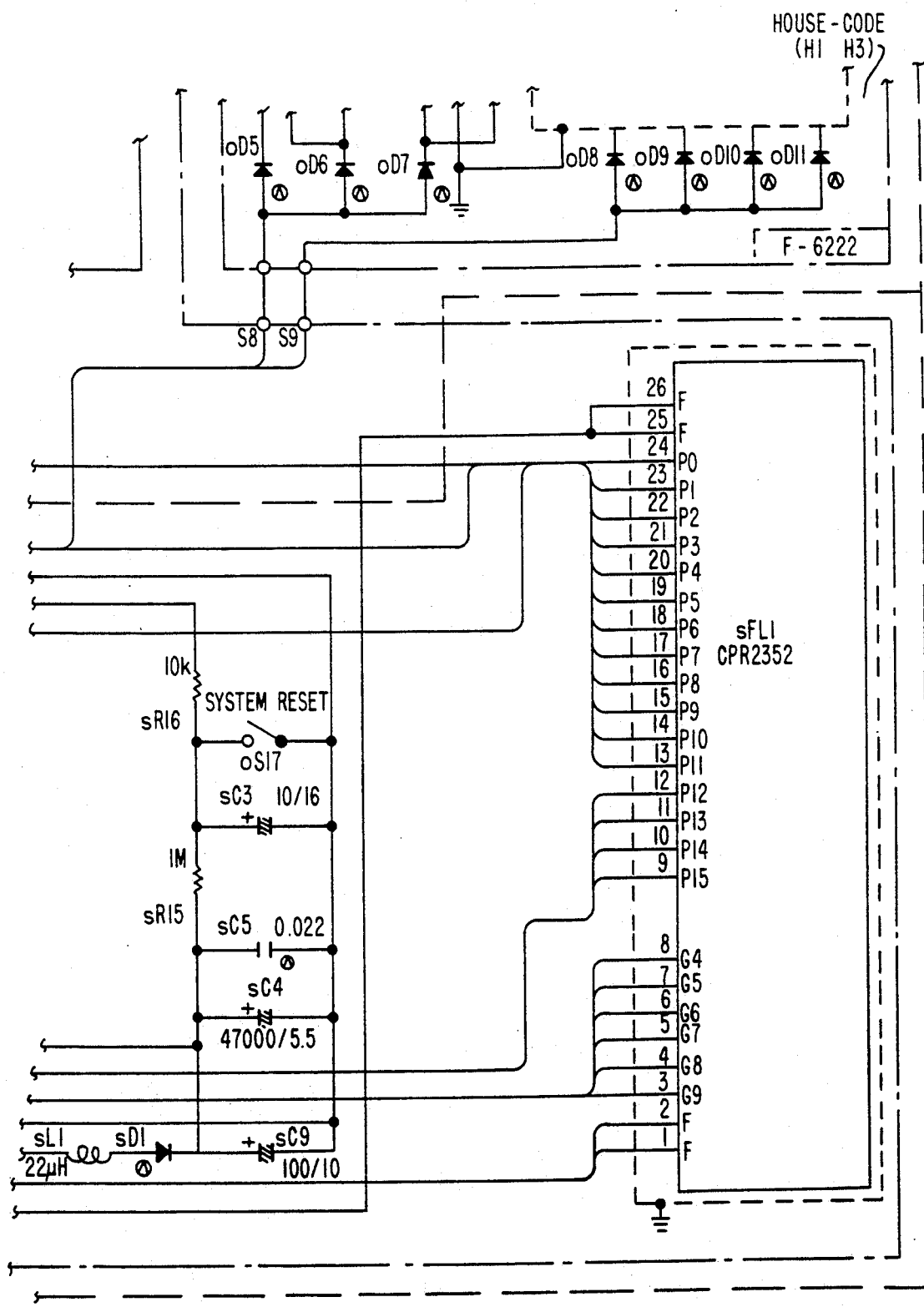
Figures 1, 5:
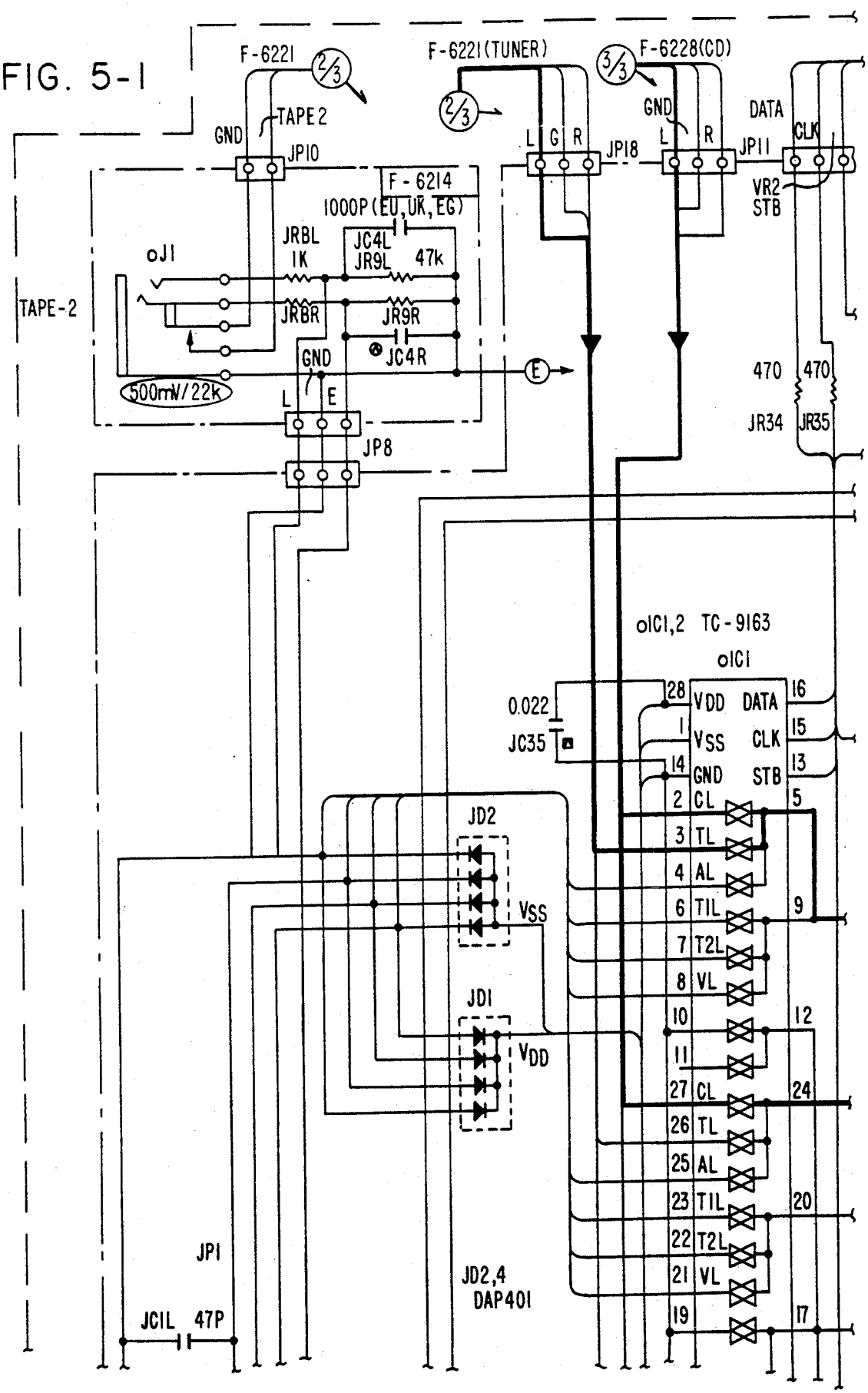
Figures 2, 5:
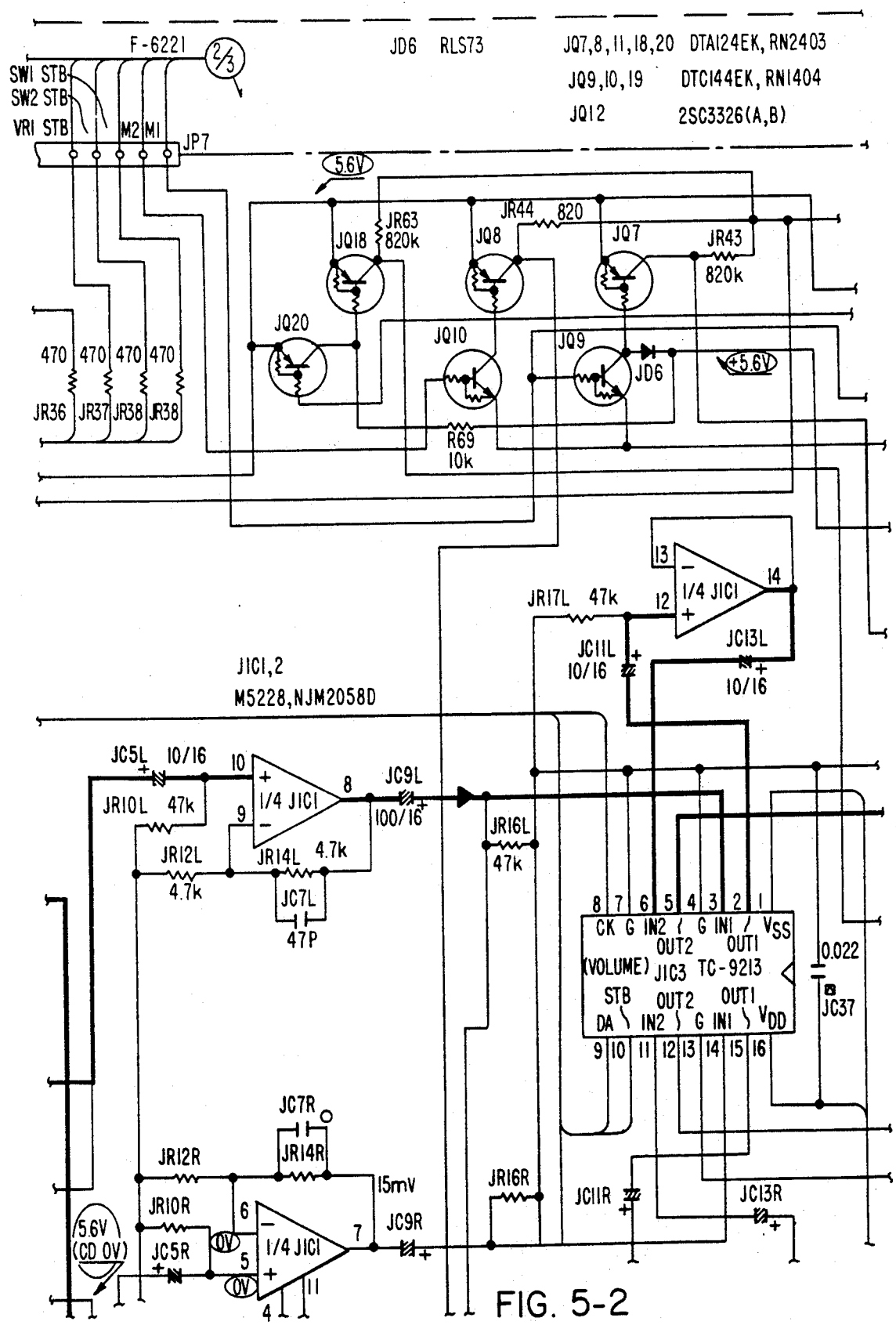
Figures 3, 5:
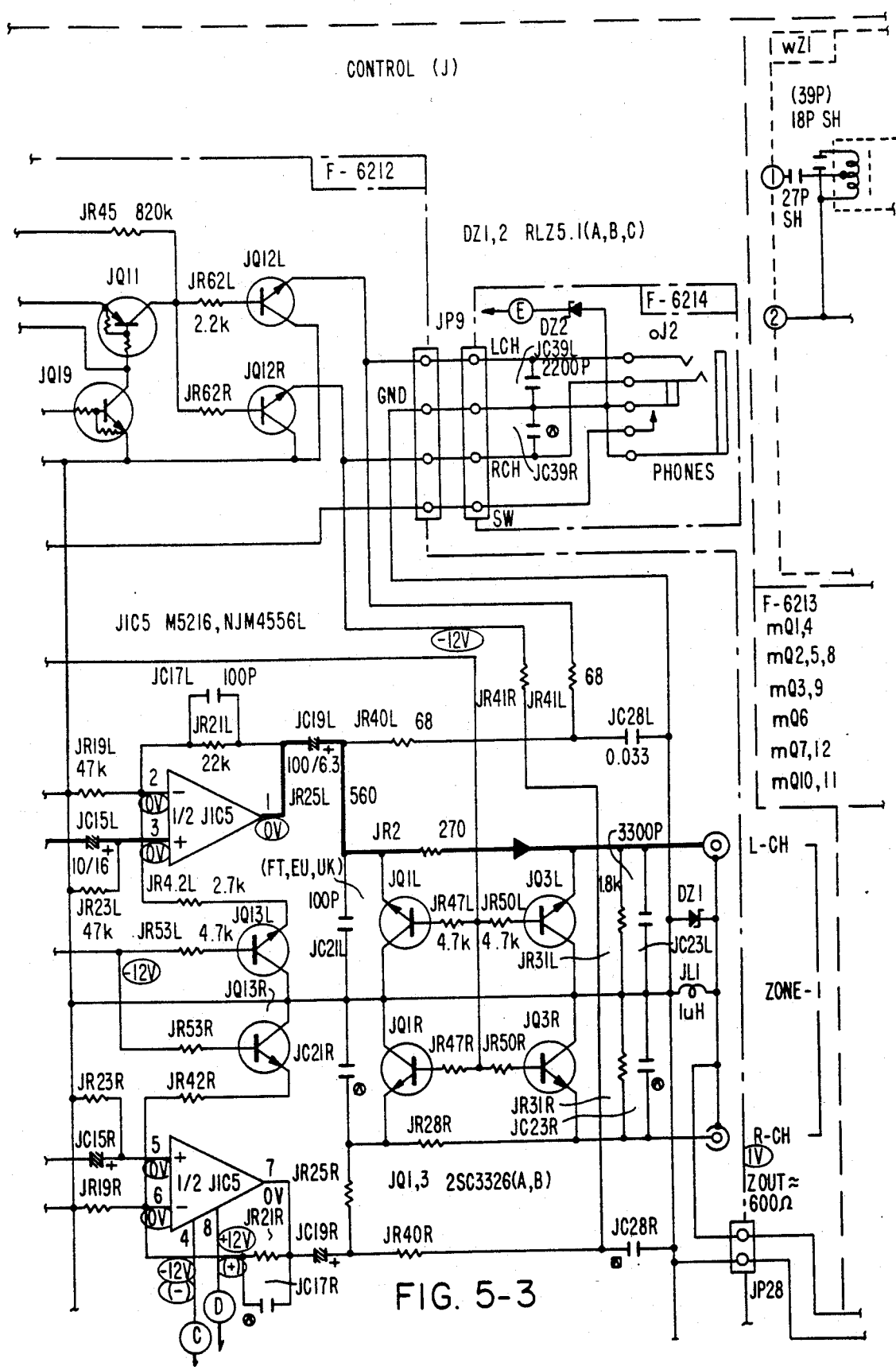
Figures 4, 5:
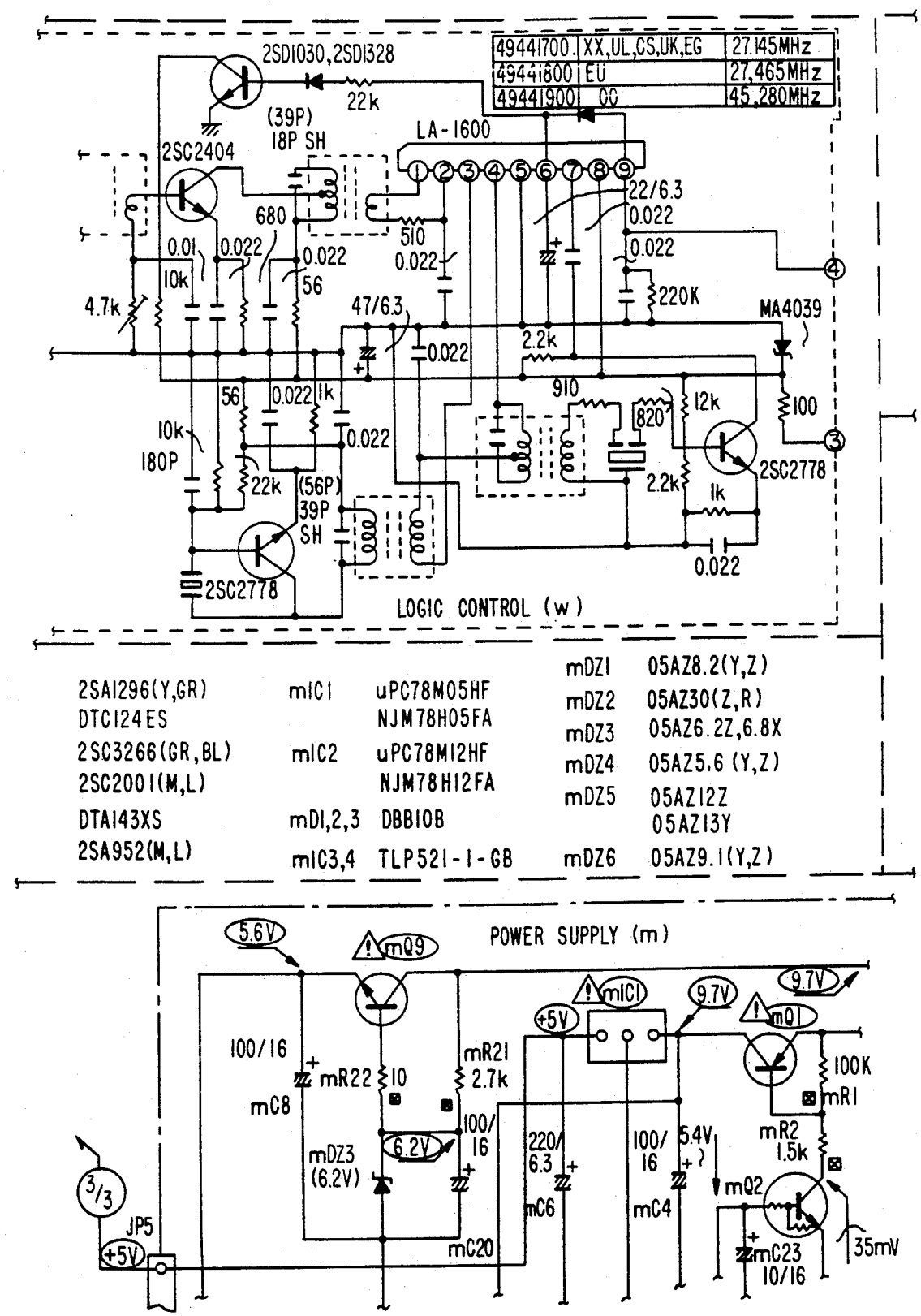
Figure 5:
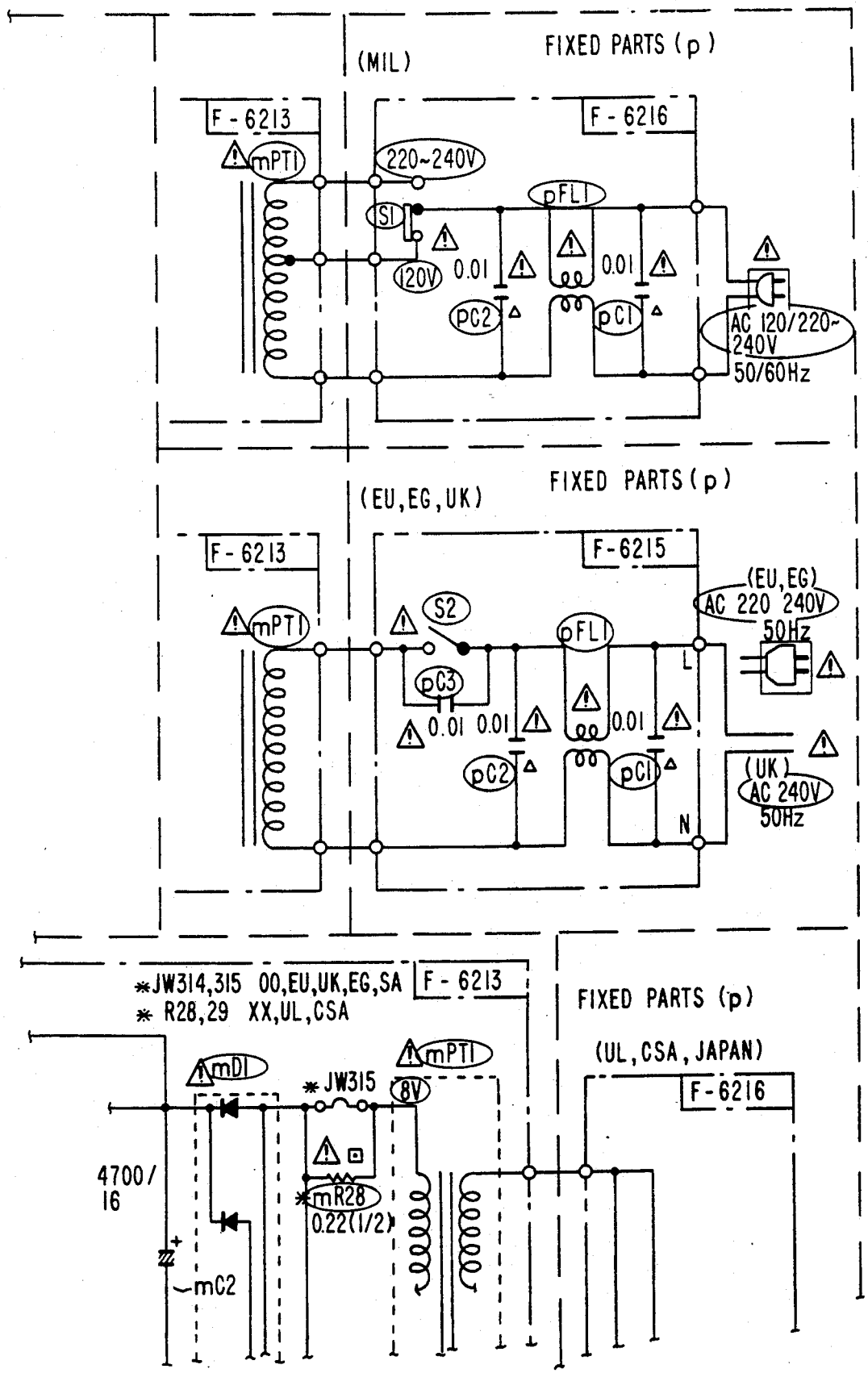
Figures 5, 6:
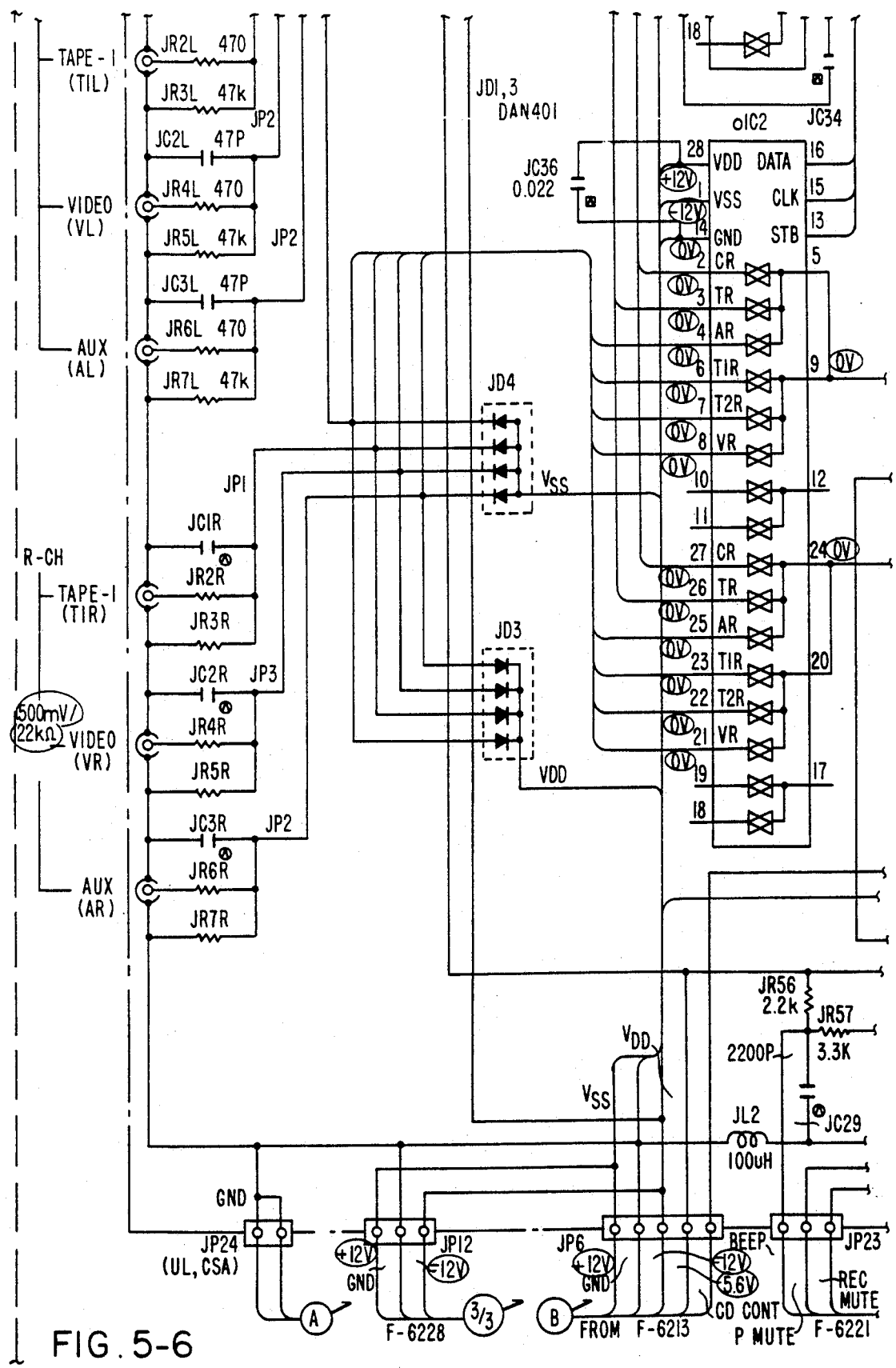
Figures 5, 6, 7:
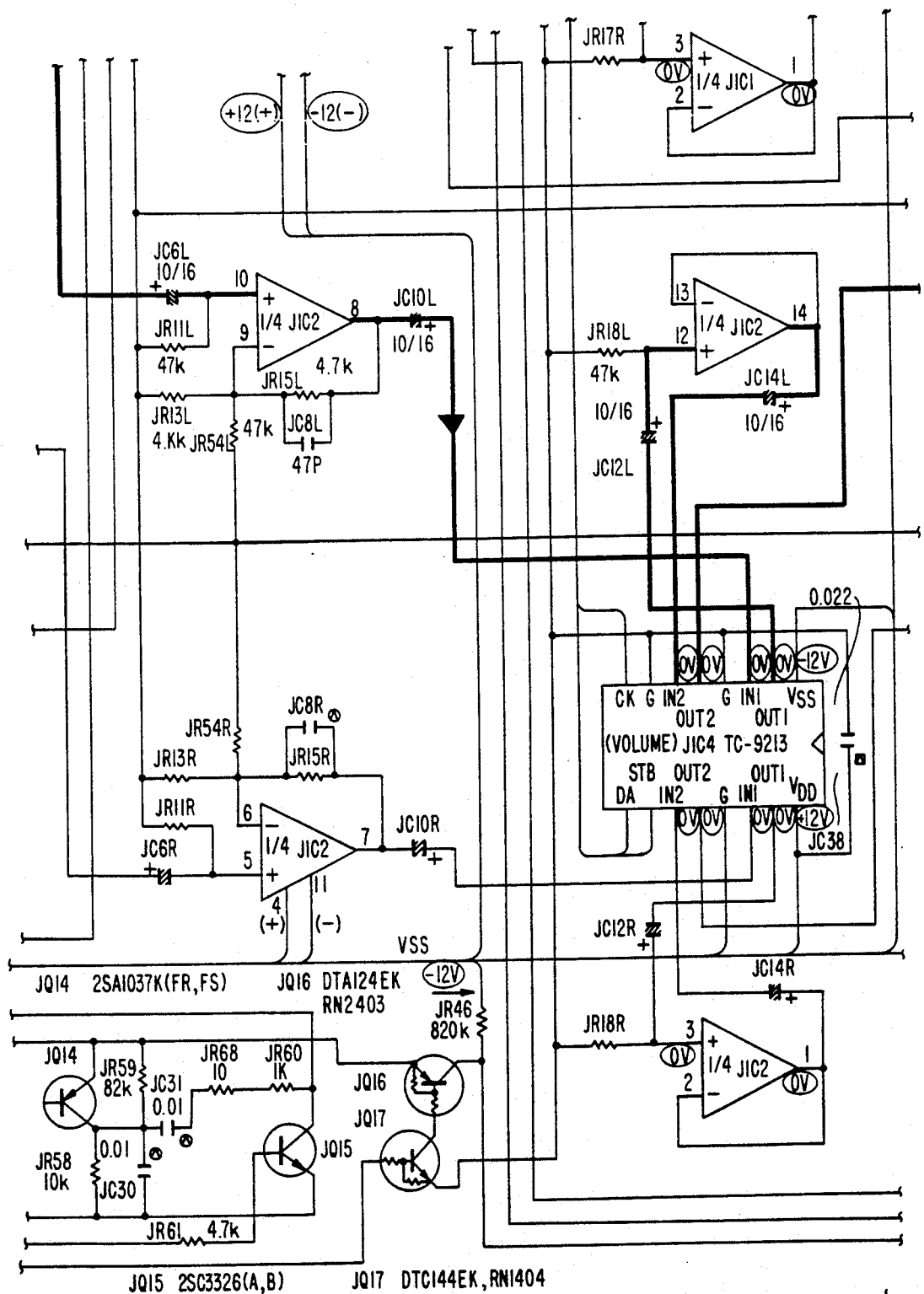
Figures 5, 6, 7, 8:
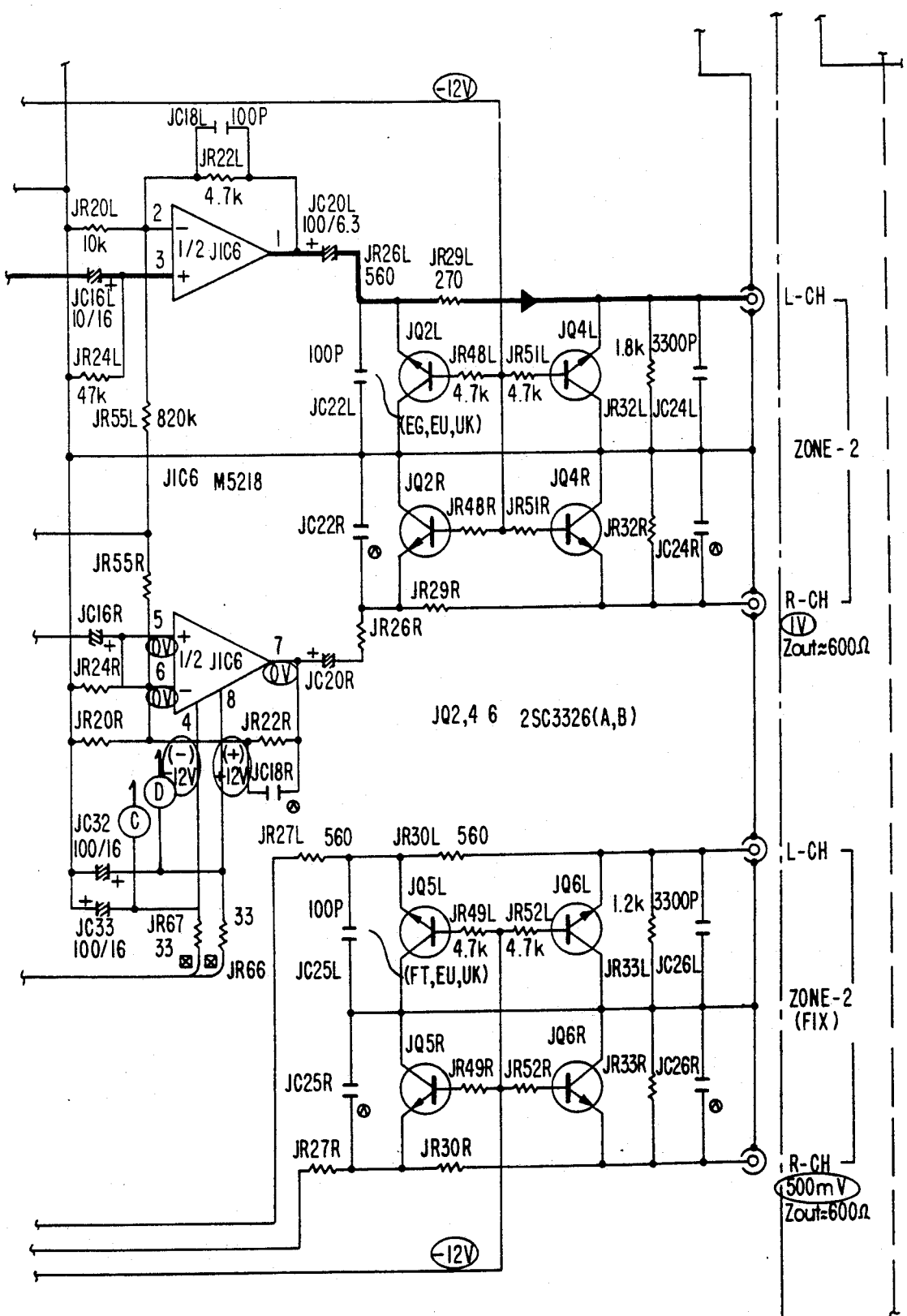
Figures 5, 6, 7, 8, 9:
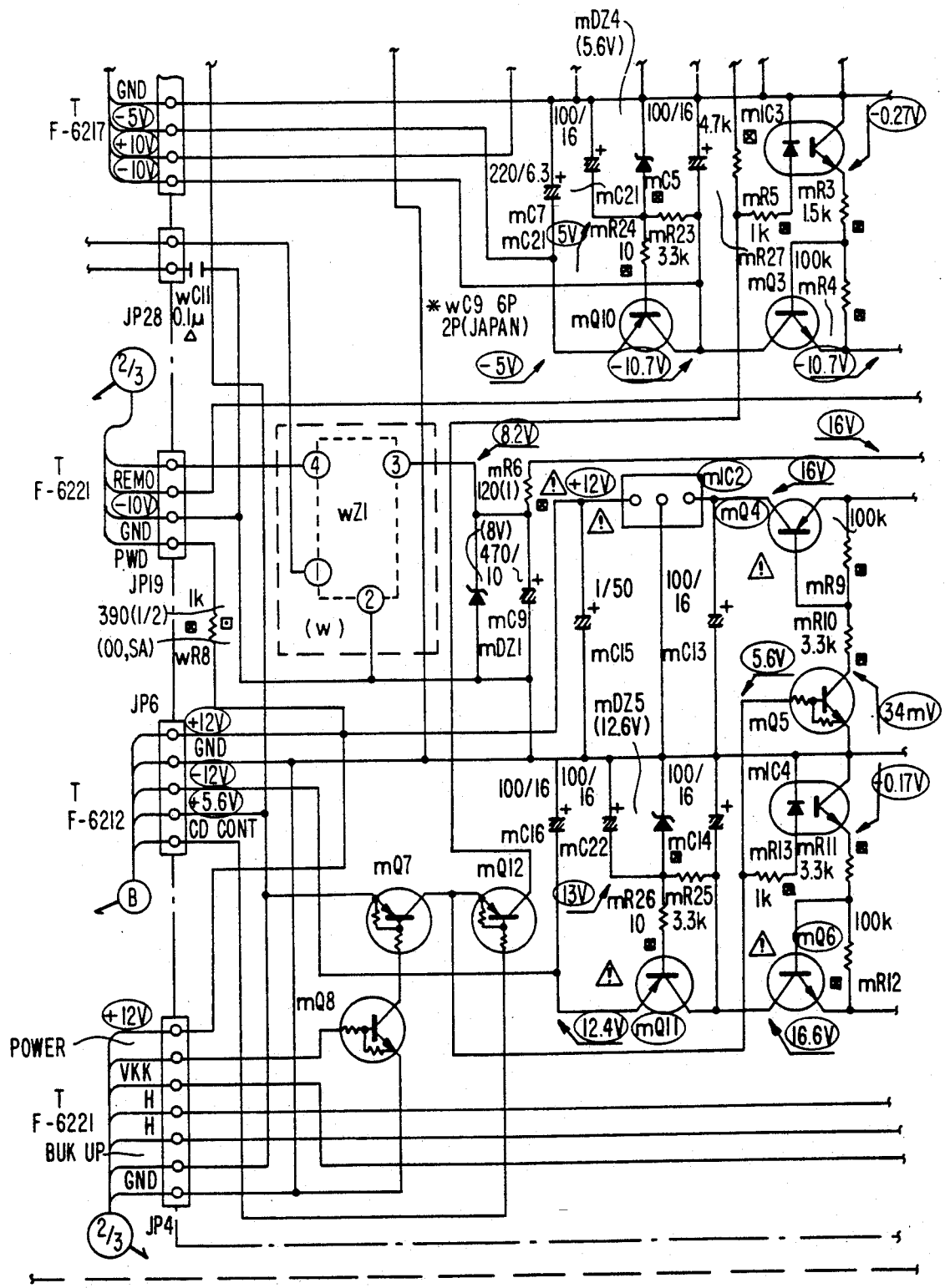
Figures 5, 6, 7, 8, 9, 10:
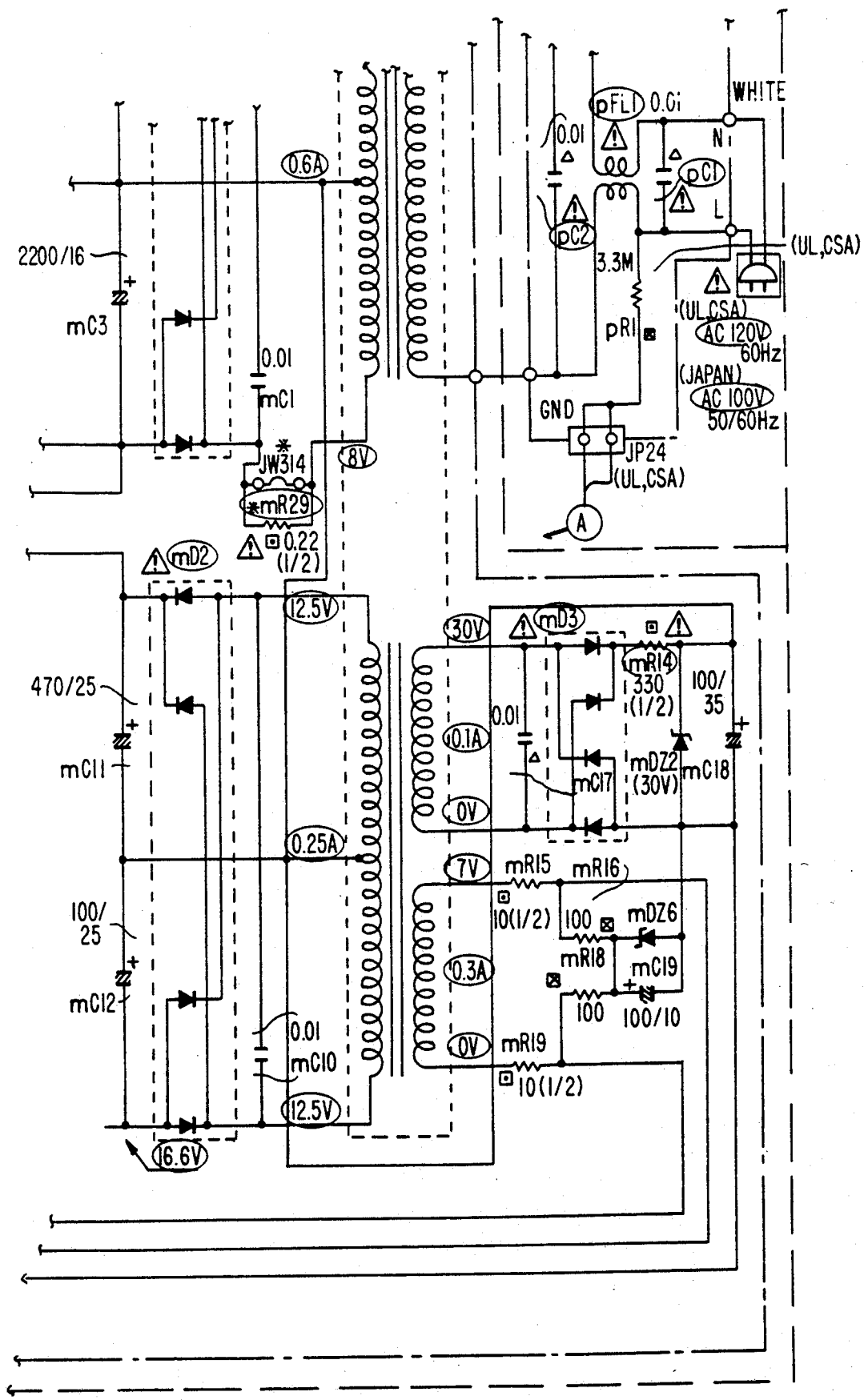

FIG. 3 is a drawing of a remote controller for the system of FIG. 2. The controller is hand held, and has various function keys, as shown on the right side of FIG. 3. These keys include keys for selecting zones and speakers 300, program sources 310, controlling the volume of output channels 320, controlling numerical functions 330, controlling track selection and playback functions 340, and controlling the system power 350.

The position of the zone selection switch 300 determines which volume control circuits, muting control circuits, and program source selectors (FIG. 2) are controlled by the remote controller. With the switch in the zone 1 position, the remote controller will issue commands to selector 221, volume control 231, and muting circuits 233 and 236. With the switch in the zone 2 position, the remote controller will issue commands to selector 222, volume control 232, and muting circuit 234.

The three positions of the speaker selection switch 300 (A, B, or C) determine which of three possible codes are appended to the remote controller transmissions. In some embodiments, these codes may be used to enable volume control functions in wireless speakers with internal volume control circuitry. Volume control signals from the remote controller are then received directly by the wireless remote speakers, and are ignored by the central controller (by disabling the volume control circuit, as discussed above). The appended codes indicate which speakers in a zone are to be adjusted. As many as three sets of speakers may be used in any one zone.

In refinements of the above embodiments, the wireless speakers may also have an active internal equalization network for equalization of room acoustics. With this refinement, an additional switch (not shown) on the rear of the remote controller would be used to set the controller into an "equalization" mode. In this second mode, the remote controller keys would control secondary, equalization functions of the speakers in place of the primary functions discussed below.

Source selections are controlled by source selection keys 310. Each key corresponds to, and is labelled for, one of the input sources for the system. In addition, the power for a zone is energized when a source selection key is pressed.

Power for a zone is removed by pressing one of the power off keys 350. The "auto off" key activates a timer, which will automatically shut off the zone power after a given time elapses. Thirty minutes are added to this time for each depression of the auto off key. The "off" key immediately shuts off the zone power, without activating the timer. When both zones are in the power off state, the main power of the system is turned off, and the system remains idle. When the power for one zone is off, then the speakers an amplifier for that zone are turned off, without affecting the other zone.

Volume control for a zone is provided by volume keys 320. These keys will mute, increase, or decrease the volume in the selected zone (by commanding the central controller to control the volume control circuit for the selected zone).

The remainder of the keys 330, 340 on the remote controller control general functional aspects of the program sources in the program signal processing system. Keys 330 are numbered 0 through 9 and provide general control of numeric functions of the program sources. Keys 340 are labelled PLAY, PAUSE, FF, FR, STOP, etc., and provide general control of track selection and playback functions of the program sources.

The functions which are controlled by the function keys 330 and 340 are determined by the source most recently selected by the remote controller. For example, if the most recently selected source was the compact disc player, the numeric keys 330 could select track numbers from the available tracks on the compact disc, and the track selection keys 340 could control the playing, stopping, pausing, scanning, introduction searching, and repeating of tracks on the compact disc. If the most recently selected source was an external tape player, the track selection keys 340 could control the playing, stopping, pausing, scanning, introduction searching, and repeating of tracks on the audio tape. Also, if the most recently selected source was the radio tuner, the numeric keys could select preset stations.

The track control keys 340 support many compact disc player functions which may not all be supported by audio tape players. Therefore, not all of the keys will operate on a audio tape program source. Depressing these keys in zone 2 in the tape mode will cause a long beep to be returned to the zone 2 speakers.

The remote controller of FIG. 3 transmits commands over the 27.145 MHz residential frequency band. Because a high frequency is used, the transmissions can easily penetrate dry walls in typical indoor environments. In some situations, the signals from the remote controllers of two nearby systems may interfere with each other and cause malfunctioning. To alleviate this possibility, the main unit (FIG. 2) has a house code input switch 246, which has three SPST switches providing eight possible house codes. The remote controller (FIG. 3) has similar switches. The commands from the remote controller are authenticated by the selected house code, which is verified by the central controller upon reception.

FIGS. 4-1 through 4-10 and FIGS. 5-1 through 5-10 are electrical schematics of a particular embodiment of the audio program system of FIG. 2, showing component values and interconnections in sufficient detail to enable those skilled in the art to practice the invention.

Other embodiments of the invention are within the scope of the following claims. For example, the above program system architectures may be applied to audio, video, or other program signal processing systems.

What is claimed is:

1. Apparatus for controlling multiple program signals in an audio system comprising,
   a central unit at a central location having a plurality of program source inputs for receiving a corresponding plurality of audio input signals,
   said central unit having at least two central unit outputs for receiving selected ones of the audio signals applied to said program source inputs,
   said central unit having at least two central unit selectors for independently selecting from said program source inputs to simultaneously deliver different selected ones of audio input signals on said program source inputs to respective ones of said central unit outputs,
   said central unit having a central unit controller controlling said selectors,
   said central unit having a central unit interface to said central unit controller having at least a source selection input and at least a general functional input corresponding to control functions associated with signals delivered to said outputs,
   said central unit having a central unit receiver,
   said central unit interface being coupled to said central unit receiver for receiving signals modulated with selection and control signals for controlling said control functions,
   a remote interface comprising a hand-held transmitter that radiates a carrier signal to said central unit receiver modulated with said selection and control signals so that an operator in a location remote from said central location may remotely operate said control unit selectors and said control functions.

2. The apparatus of claim 1, wherein
   each of said program source inputs comprises audio signals from one of the group consisting of a compact disc player, a radio tuner, a phonograph player, a television audio signal source, and an audio tape player.

3. The apparatus of claim 1, and further comprising speakers energized by said program source outputs through speaker wires.

4. The apparatus of claim 2, and further comprising speakers energized by said program source outputs through speaker wires.

5. The apparatus of claim 1, and further comprising speakers energized by at least one of said program source outputs via radio transmission.

6. The apparatus of claim 2, and further comprising speakers energized by at least one of said program source outputs via radio transmission.

7. The apparatus of claim 5, further comprising at least two volume controllers responsive to said central controller for attenuating an associated one of the selected program source outputs.

8. The apparatus of claim 6, further comprising at least two volume controllers responsive to said central controller for attenuating an associated one of the selected program source outputs.

9. The apparatus of claim 1, and further comprising at least a second of said remote interfaces,
   said central unit controller having priority circuitry for conferring priority of control over a respective selected program source input by that one of said remote interfaces which initiated selection of said respective selected program source input.

10. The apparatus of claim 9, and further comprising a verifier for adding a verification signal to at least one of said program source outputs in response to received signals from said remote interfaces.

11. The apparatus of claim 10 wherein
    said verification signal is one of a plurality of identifiable types,
    each said type being usable for verifying a response by said central unit to command a respective control function.

12. The apparatus of claim 1, and further comprising a verifier for adding a verification signal to at least one of said program source outputs in response to received signals from said remote interfaces.

13. The apparatus of claim 12 wherein
    said verification signal is one of a plurality of identifiable types,
    each said type being usable for verifying a response by said central unit to command a respective control function.

14. The apparatus of claim 1 wherein said central unit receiver is tuned to a central unit radiofrequency for receiving radiofrequency signals capable of being transmitted through conventional walls of a building modulated with selection and control signals for controlling said control functions; and
    said hand-held transmitter radiates a radio frequency carrier at said central unit radiofrequency modulated with said selection and control signals so that an operator in a location separated from said central location by a building wall may remotely operate said control unit selectors and said control functions.

15. The apparatus of claim 14 wherein said central unit receiver radio frequency is in the 27.145 MHz band.

* * * * *